(12) United States Patent
Jain

(10) Patent No.: US 10,482,542 B1
(45) Date of Patent: Nov. 19, 2019

(54) TAX FRAUD DETECTION THROUGH LINKED RELATIONSHIPS

(71) Applicant: HRB Innovations, Inc., Las Vegas, NV (US)

(72) Inventor: Rajiv Jain, Overland Park, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 913 days.

(21) Appl. No.: 14/921,143

(22) Filed: Oct. 23, 2015

(51) Int. Cl.
*G06Q 40/00* (2012.01)

(52) U.S. Cl.
CPC ................... *G06Q 40/123* (2013.12)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,043,448 B2* | 5/2006 | Campbell | ............... | G06Q 10/10 705/19 |
| 7,627,504 B2* | 12/2009 | Brady | ................... | G06Q 40/00 705/1.1 |
| 7,805,343 B1* | 9/2010 | Lyons | ................... | G06Q 40/123 705/31 |
| 7,860,763 B1* | 12/2010 | Quinn | ................... | G06F 17/243 705/31 |
| 8,140,413 B2* | 3/2012 | Ramsey | ............. | G06Q 10/0635 705/31 |
| 8,156,018 B1* | 4/2012 | Quinn | ................. | G06F 17/2264 705/19 |
| 8,412,605 B2* | 4/2013 | Griffin | ................... | G06Q 40/00 340/5.81 |
| 8,423,434 B2* | 4/2013 | Ramsey | ............. | G06Q 10/0635 705/31 |
| 8,694,395 B2* | 4/2014 | Houseworth | .......... | G06Q 10/10 705/31 |
| 9,471,820 B2* | 10/2016 | Arthaber | ................ | G01S 13/751 |
| 9,845,237 B2* | 12/2017 | Tseng | ........................ | B82B 3/00 |
| 2012/0030076 A1* | 2/2012 | Checco | .................. | G06Q 40/00 705/31 |
| 2012/0226591 A1* | 9/2012 | Ramsey | ............. | G06Q 10/0635 705/31 |

(Continued)

OTHER PUBLICATIONS

File History of U.S. Appl. No. 14/692,314, filed Apr. 21, 2015, entitled Computer Program, Method, and System for Detecting Fraudulently Filed Tax Returns; Applicant: HRB Innovations, Inc.

(Continued)

*Primary Examiner* — Frantzy Poinvil
(74) *Attorney, Agent, or Firm* — Erise IP, P.A.

(57) ABSTRACT

Determining whether a subject tax return is fraudulent includes extracting from the subject tax return information and identifying one or more subject nodes based on the extracted information. Separately, a plurality of external nodes is generated based upon previously filed tax returns. At least a portion of the plurality of external nodes is fraud-indicative nodes. The subject nodes are compared to the external nodes to identify shared relationships of related information, such as a tax return related to an external node having the same bank account information as the subject tax return related to the subject node. Based upon shared information, links are determined to indicate whether the subject node is indicative of fraud.

20 Claims, 8 Drawing Sheets

(56) References Cited

U.S. PATENT DOCUMENTS

2016/0063645 A1* 3/2016 Houseworth ........ G06Q 40/123
  705/31
2017/0178249 A1* 6/2017 Pigoski, II ........... G06Q 40/123
2018/0033009 A1* 2/2018 Goldman ........... G06Q 20/4016

OTHER PUBLICATIONS

File History of U.S. Appl. No. 14/692,062, filed Apr. 21, 2015, entitled Computer Program, Method, and System for Detecting Fraudulently Filed Tax Returns ; Applicant: HRB Innovations, Inc.

* cited by examiner

TAX FRAUD DETECTION THROUGH LINKED RELATIONSHIPS

RELATED APPLICATIONS

Embodiments and/or features of the invention described in the present document may be used with the subject matter disclosed in commonly assigned U.S. patent application Ser. No. 14/692,062, filed Apr. 21, 2015, and entitled "COMPUTER PROGRAM, METHOD, AND SYSTEM FOR DETECTING FRAUDULENTLY FILED TAX RETURNS." The above-mentioned patent application is hereby incorporated by reference in its entirety into the present application.

Embodiments and/or features of the invention described in the present document may be used with the subject matter disclosed in commonly assigned U.S. patent application Ser. No. 14/692,314, filed Apr. 21, 2015, and entitled "COMPUTER PROGRAM, METHOD, AND SYSTEM FOR DETECTING FRAUDULENTLY FILED TAX RETURNS." The above-mentioned patent application is hereby incorporated by reference in its entirety into the present application.

BACKGROUND

1. Field

Embodiments of the invention relate to fraud prevention in the field of electronically filed tax returns. More specifically, embodiments of the invention relate to fraud detection through linked relationships.

2. Related Art

Government taxing authorities, such as the U.S. Internal Revenue Service, require a taxpayer to file a tax return with the taxing authority for a specified tax period, such as a calendar year. The tax return sets forth tax information associated with the taxpayer, such as the taxpayer's name, address, social security number, wages, retirement investments, capital gains and losses, dependents, etc. The taxpayer commonly owes taxes to the government taxing authority. In many instances, the taxes are withdrawn from the taxpayer's payroll via income tax withholdings. However, in some instances, the taxpayer may receive a tax refund based on the tax liability of the taxpayer in comparison to any income tax withholdings throughout the tax period. Because of the opportunity to receive a tax refund from the government taxing authority, a malfeasant may seek to file a fraudulent tax return.

In some instances, the fraudulent tax return includes tax information for a legitimate taxpayer, such as the legitimate taxpayer's social security number and address. However, to receive the tax refund, the fraudulent tax return may include false information, such as a bank deposit account number for the malfeasant and not for the taxpayer. In such an instance, the government taxing authority disburses the tax refund to the malfeasant's bank account and not the bank account of the legitimate taxpayer.

In recent years, tax fraud has become increasingly rampant. In 2014, the IRS reported that it caught $24.5 billion of fraudulent tax returns, and that it estimates to have paid an additional $5.5 billion in fraudulent tax returns. The increase in tax fraud can be linked to identity theft and data breaches, in which the taxpayer's personal information becomes compromised. The increase can also be linked to lax standards and verification by taxing authorities. For example, some malfeasants will file tax returns with multiple states because the various states do not share information together to help combat tax fraud.

Tax fraud is becoming increasingly difficult to detect based upon increasingly sophisticated malfeasants. These malfeasants are preparing tax returns that appear, on the surface and in direct comparison to other filed tax returns, to be entirely legitimate. These fraudulent tax returns are therefore undetectable utilizing manual review or any existing computer-based functions. What is lacking in the prior art is a comprehensive way to detect fraudulent tax returns and fraudulent users based upon an in-depth linking analysis of many filed tax returns.

SUMMARY

Embodiments of the invention detect fraudulently filed tax returns and fraudulent users. In general, when a user prepares or submits a subject tax return that relates to a subject taxpayer for filing with a government taxing authority, embodiments of the invention analyze tax information of various sources. The information from these sources is then compared to similar data for a large number of previously submitted tax returns. The data acts as nodes for analysis. Nodes are linked together based upon relationships, and these links are analyzed to determine whether the subject tax return is genuine (i.e., not fraudulent).

The analysis discussed herein allows the system to identify fraudulent tax returns based upon an in-depth and detailed analysis of the relationships of various tax returns. An analysis of this type would not be possible during a manual review of tax returns. The analysis enables the discovery of patterns in fraudulent tax returns that would not be otherwise apparent. The analysis also enables the system to provide additional layers of review to tax returns that are suspected, but not known, to be fraudulent.

A first embodiment of the invention is generally directed to a non-transitory computer-readable storage medium having a computer program stored thereon for determining confidence indicators that corresponds with a user. The computer program instructs at least one processing element to perform the following steps: receiving tax information associated with a subject tax return for a subject taxpayer; receiving user information associated with a user that submitted the subject tax return; identifying a plurality of subject nodes related to at least one of said tax information and said user information; comparing the plurality of subject nodes to a set of external nodes, wherein a portion of the set of external nodes are fraud-indicative nodes; linking at least one subject node to at least one fraud-indicative node through at least one neutral node; and identifying confidence indicators based upon the linking, wherein each confidence indicator is indicative that the user is either genuine or fraudulent.

A second embodiment of the invention is generally directed to a fraud detection system for determining a likelihood that a user submitting a subject tax return is genuine, the system comprising an indicator acquisition engine and an indicator analysis engine. The indicator acquisition engine determines a plurality of confidence indicators regarding the user, wherein each confidence indicator is indicative that the user is either genuine or fraudulent. The indicator acquisition engine includes an external linking analyzer. The external linking analyzer is configured to acquire a plurality of subject nodes related to the user and the subject tax return and to compare the plurality of subject nodes to a set of external nodes. The external linking analyzer is also configured to link at least one subject node to at least one fraud-indicating node through at least one intermediary node, wherein said fraud-indicating node and said intermediary node are within the set of external nodes. The indicator analysis engine for analyzing said plurality of confidence indicators determined by the indicator acquisition engine and determining a likelihood that the user is genuine.

A third embodiment of the invention is generally directed to a method of determining whether a subject tax return is fraudulent, the method comprising the following steps: generate a plurality of external nodes based upon previously filed tax returns, wherein at least a portion of the external nodes are fraud-indicative nodes and at least a portion of the external nodes are neutral nodes; link the plurality of external nodes together via shared relationships of related information; acquire tax information related to the subject tax return; identify subject nodes based upon the tax information; compare the subject nodes to external nodes for related information; and link at least one subject node to at least one fraud-indicative node via at least one neutral node.

BRIEF DESCRIPTION OF THE DRAWING FIGURES

Embodiments of the invention are described in detail below with reference to the attached drawing figures, wherein.

Figure 1:
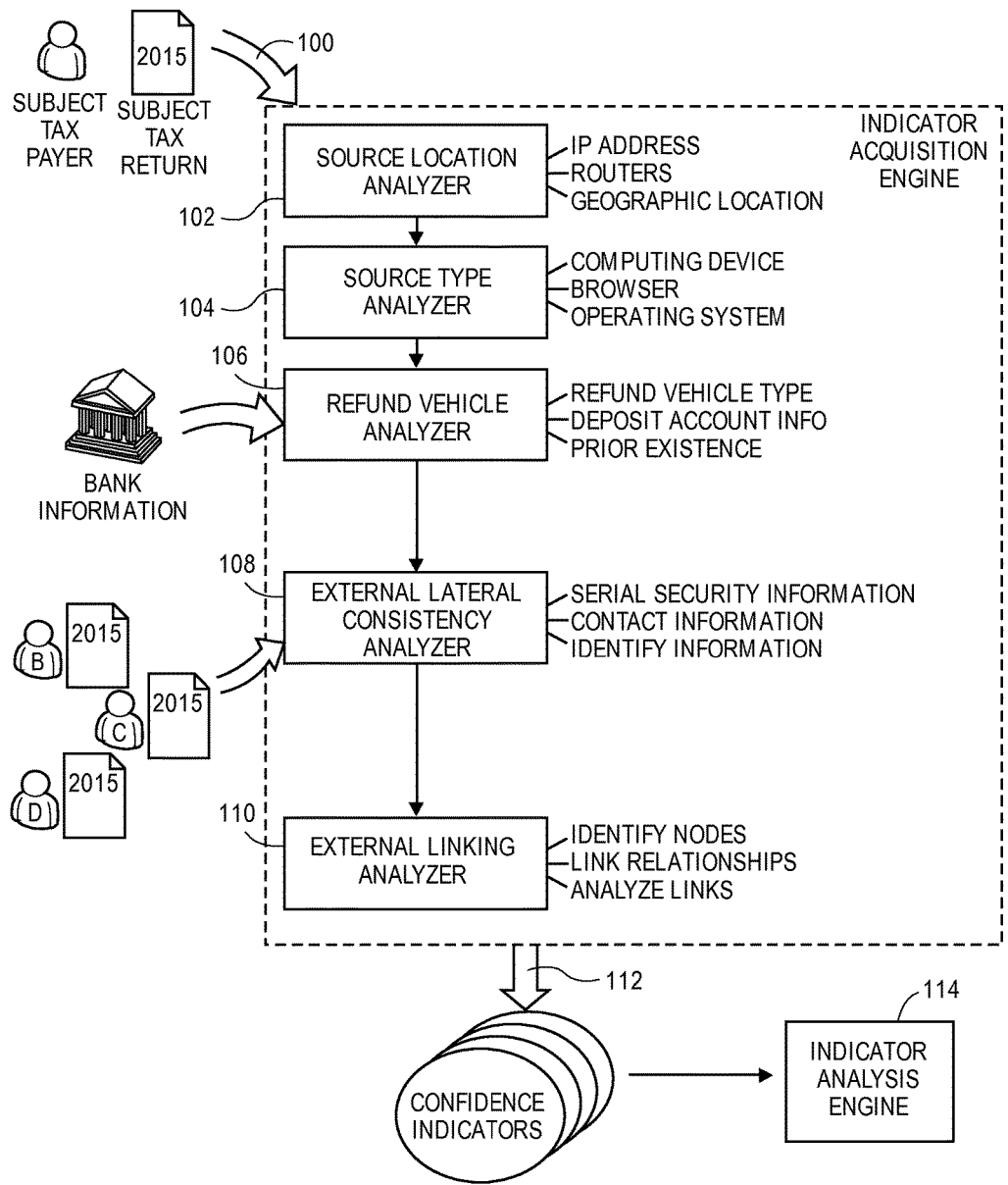
FIG. 1 is a flow diagram of a first exemplary embodiment of the invention, illustrating the various components of a system for detecting fraudulent tax returns by identifying confidence indicators.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein. It should also be noted that the subtitled sections within the Detailed Description are for the purpose of orienting the reader and should not be construed in a limiting sense.

Embodiments of the invention comprise a computer program, a computerized method, and a system for detecting fraudulent tax returns. Embodiments of the invention analyze tax returns before, during, or after filing with a government taxing authority to help ensure that the tax return is genuine (i.e., legitimate and not fraudulent). Embodiments of the invention verify the tax returns by linking together nodes from various sources, as discussed in depth below. An exemplary node is an IP address used to file the subject tax return, a telephone number or bank account information associated with the subject tax return, or W-2 information for the subject tax return. Based upon linked analysis (where two or more nodes are linked via at least one intermediary node), and direct analysis (where two nodes are linked without any intermediary nodes), embodiments of the invention identify various confidence indicators that are indicative of a level of confidence that the subject tax return is either fraudulent or genuine. Based upon the linked and direct analyses and the determined confidence indicators, embodiments of the invention calculate or otherwise determine a likelihood that the user (or the subject tax return, as the case may be) is genuine. This likelihood may be expressed as a taxpayer identity confidence score. Based upon confidence indicators, the subject tax return may be submitted to the taxing authority, further authenticated, denied acceptance, denied transmission, quarantined, flagged for further investigation, etc.

System Overview

Turning to the figures, an exemplary embodiment of the invention is illustrated in FIG. 1. Broadly, FIG. 1 shows the identification of confidence indicators and the analysis of those confidence indicators by a fraud detection system. The fraud detection system broadly comprises a source location analyzer, a source type analyzer, a refund vehicle analyzer, an external lateral consistency analyzer, and an external linking analyzer, each of which is described in detail below. In embodiments of the invention, the source location analyzer, the source type analyzer, the refund vehicle analyzer, and the external lateral consistency analyzer analyze the subject tax return and various information to determine if there are confidence indicators. The external linking analyzer utilizes the various information acquired by the other analyzers and looks for deeper, linked connections and relationships. The various analyzers therefore identify confidence indicators based upon direct and linked relationships. Confidence indicators are, generally speaking, measures of the probability or likelihood that the subject tax return is genuine or fraudulent based upon a single or a plurality of factors and analyses discussed in depth below. Confidence indicators may be "positive" in that they are indicative of genuineness or "negative" in that they are indicative of fraud.

In Step 100, an indicator acquisition engine receives information about a subject taxpayer and a subject tax return (labeled "2015" as an exemplary tax year to which the subject tax return relates). This information may further include information related to the user and a computing device utilized by the user, as discussed below.

The indicator acquisition engine may comprise a plurality of sub-component indicator acquisition analyzers that determine confidence indicators based upon various criteria and sources. In Step 102, a source location analyzer determines confidence indicators related to the source location from which the user is accessing the system. For example, the source location analyzer may consider the Internet Protocol ("IP") address, routers, and servers through which the user accesses the system, the geographic location where the user is located, etc. In Step 104, a source type analyzer determines confidence indicators related to the computing device from which the user is working. For example, the source type analyzer may consider the type of computing device, a browser used to access the system, an operating system for the device, etc.

In Step 106, a refund vehicle analyzer determines confidence indicators related to the selected refund vehicle through which the subject taxpayer will receive their tax refund. For example, the refund vehicle analyzer may consider the type of refund vehicle chosen by the user, the deposit account information, a time period for which the deposit account information has been opened or known (accounts opened for a longer time period are more indicative of genuineness), the prior existence or ongoing nature of the refund vehicle, etc. The refund vehicle analyzer may receive external information from the bank based upon the tax information input.

In Step 108, an external lateral consistency analyzer determines confidence indicators related to comparing the subject tax return to other tax returns filed for the current (or in some embodiments, past) tax year that relate to other taxpayers. The external lateral consistency analyzer receives previously filed tax returns or sets of information associated with the filed tax returns (each labeled "2015," the same tax period as the subject tax return) that in turn relate to a plurality of taxpayers (labeled "B"-"D"). In embodiments, all of the plurality of taxpayers is different than the subject taxpayer. In alternative embodiments of the invention, at least a portion of the plurality of taxpayers is different than the subject taxpayer. For example, the external lateral consistency analyzer may consider duplicate social security numbers (SSNs), duplicate contact information, and other duplicate or suspicious identification information.

In Step 110, an external linking analyzer performs a more in-depth analysis by identifying nodes, linking the nodes together through commonality relationships, and analyzing these links. A "node" is defined further below, but to assist in understanding the general invention, consider a node as an item of information, or in embodiments, a plurality of items of information, related to the subject tax return. In embodiments, the system extracts items of information related to the subject tax return and then analyzes the items of information to identify one or more nodes. For example, a node may be the IP address used to file the subject tax return, the name of the taxpayer, bank account information, W-2 information, etc. provided on or associated with the subject tax return, a date on which the subject tax return was prepared and/or filed, any authentication information used to authenticate preparation, submission, or filing of the tax return (e.g., use of a taxpayer identification number or preparation of the tax return using self-preparation tax software where the user account was used for previous tax years are more indicative of a genuine tax return), etc. Once the nodes related to a subject tax return are associated, the external linking analyzer links the nodes together. As described below, this linking of nodes may be for some or all nodes related to a particular subject tax return or may be for some or all nodes related to one or more previously filed tax returns. Once the nodes are linked, the external linking analyzer further analyzes the linked nodes to identify the confidence indicators, as discussed below.

In some embodiments, as illustrated, the external linking analyzer performs these analyses in conjunction with the other analyzers. In other embodiments, the external linking analyzer performs these analyses when an uncertainty as to the fraudulent or genuine nature of the subject tax return is determined in response to the analysis by the above-discussed analyzers. In still other embodiments, the external linking analyzer is a stand-alone component of the fraud detection system that is triggered by a taxpayer identity confidence score falling into a certain intermediate range or by a manual selection to utilize the external linking analyzer. It should be appreciated that in embodiments of the invention, the external linking analyzer is processor and memory intensive.

Based upon all (or some) of the above analyses, in Step 112 the indicator acquisition engine accumulates all of the confidence indicators and submits them to the indicator analysis engine. In Step 114, the indicator analysis engine considers the plurality of confidence indicators to determine the likelihood that the user is genuine, which may be expressed as a taxpayer identity confidence score. The indicator analysis engine weighs the generated confidence indicators, compares them together or in discrete groups, and otherwise performs various statistical analyses. The indicator analysis engine analyzes the consistency of the confidence indicators together, as to whether they indicate genuineness or fraud. As discussed below, the system may take further actions, such as submit the tax return to the taxing authority, deny filing, report the user and/or the subject tax return to an appropriate law enforcement agency, etc.

Before discussing these steps in more detail, terms used herein will be discussed for clarity. The following discussion provides examples and broad, non-limiting discussions of the terms herein.

A "taxpayer" includes any entity, either a legal or natural person, that files a tax return with a government taxing authority. The taxpayer may also be a first spouse and a second spouse filing a joint return. Taxes to be paid can be United States Federal Income Tax, income tax for the various states within the United States, corporate taxes, partnership taxes, LLC taxes, property taxes, tariffs, or other taxes. Typically, the taxpayer provides information relevant to themselves and the amount of tax owed in the form of the tax return. The tax return is discussed more below. It should also be noted that in embodiments of the invention, the taxpayer is instead a beneficiary of a government entitlement program, as discussed below.

The "subject taxpayer," as used herein, refers to the taxpayer for which the tax return purports to apply. The subject taxpayer is the taxpayer whose name or names and other information appear on the tax return. In most instances, all or most of the subject taxpayer information will relate to a single discernable subject taxpayer (or two discernable natural persons that are spouses of each other). For example, in some instances, a malfeasant will copy subject taxpayer information from a filed tax return, change the bank deposit account information, and submit a new fraudulent tax return. In this example, the subject taxpayer is the taxpayer whose information appears on the filed tax return (whose information was copied from a previously filed tax return). In some instances, the subject taxpayer information is an amalgamation of more than one taxpayer's information. For example, the subject taxpayer information may include a fake name, a stolen Social Security Number, a fake address, and deposit account information for the malfeasant. In some instances, the subject taxpayer information is mostly indicative of a single discernable entity. For example, the subject taxpayer information may include all true information for the subject taxpayer, but also include a physical address or post office box address associated with the malfeasant in an attempt to have the tax return check delivered to that location. In this example, the subject taxpayer is the single discernable entity to which the majority of the information applies.

Embodiments of the invention are generally directed to the detection and identification of malfeasants in the submission of fraudulent tax returns. Malfeasants operate in a number of methods to attempt to receive an illegal tax return. A few of those methods have been and will be briefly discussed for the sake of clarity. However, it should be appreciated that embodiments of the invention are directed to the detection and identification of other methods and types of malfeasants. It should be appreciated that in some instances, the subject taxpayer is a malfeasant. In these instances, the malfeasant may also be the user of the system or the customer of the tax professional. For example, the subject taxpayer may be a malfeasant who deliberately underreports income or claims deductions for which they do not qualify. Many fraudulent tax returns fall into one of two categories: those in which a malfeasant files a tax return comprising at least some personal identification information that belongs to another, and those in which a malfeasant files a tax return comprising a substantially duplicate tax return of a subject taxpayer with altered deposit account information. In both of these categories, the malfeasant is performing illegal acts in an attempt to receive a tax refund amount to which they are not entitled. Embodiments of the invention, as discussed below, may detect fraudulent returns in either, both, or other categories.

The "user" is the person who is utilizing or interacting with the system. The user acts, or purports to act, on behalf of the subject taxpayer. Examples of users include the subject taxpayer, an authorized friend or family member of the subject taxpayer, a tax professional, a financial professional, or a malfeasant. In some embodiments, the user is connected to the system while the discussed steps are performed. In other embodiments, the user is no longer connected to the system while the discussed steps are performed. A user is "genuine" when they either are the subject taxpayer or are someone duly authorized to act on the taxpayer's behalf. A user is "fraudulent" when the user is not authorized by the subject taxpayer and/or preparing and submitting a fraudulent tax return. An "operator" is a person associated with the system, such as an administrator, tax professional, or the like.

Utilizing Embodiments of the Invention

Embodiments of the invention can be utilized by any of several types of entities. Embodiments of the invention may be used by a tax professional, a taxpayer using a self-preparation tax return product, a financial professional, a government taxing authority prior to processing of the tax return, or a third party acting on behalf of either or both of the tax professional or the taxpayer. As utilized by the various entities, the invention may serve various purposes. First, the invention may be a background operation that monitors the input of information as the user is entering it. Second, the invention may be a gatekeeper that analyzes the completed tax return before allowing the tax return to be submitted to the taxing authority. Third, the invention may be a triage function that examines tax returns that are designated as potentially fraudulent by an outside person or function. For example, an agent of the taxing authority notes potential indications of fraud in a tax return under review and submits the return for further analysis by the system. Fourth, the invention may be a surveyor function that tests certain tax returns at random or designated intervals.

In embodiments of the invention, a self-preparation tax return product utilizes the invention. For example, if the taxpayer uses a self-preparation tax return product, such as tax preparation software, embodiments of the invention provide a service to the taxpayer in conjunction with using the tax preparation software. The service may be provided to the user as a value-added benefit to the tax preparation software or as a pay service. Alternatively, if embodiments of the invention are used by the tax professional, the tax professional may use the service in conjunction with preparation and filing of the tax return.

In embodiments of the invention, the invention is utilized by a tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing at least a portion of the set of taxpayer information. It should also be noted that in rare instances, the tax professional may be a malfeasant. To please clients, some tax professionals claim prepare tax returns claiming additional deductions and credits for which the subject taxpayer does not qualify. Some tax professionals also steal the identities of their clients to prepare future fraudulent tax returns based upon these identities. Embodiments of the invention detect fraud by malfeasant tax professionals.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional does not actually prepare, or assist in preparing, the tax return. Instead, the financial professional has access to a completed and/or filed tax return that was prepared by the taxpayer or the tax professional. Embodiments utilized by the financial professional may be a free or pay service provided by the financial professional to clients to help bolster the legitimacy of the clients' tax returns. The financial professional may do so because the financial professional has access to additional authentication information for the taxpayer, in excess of the authentication information available to the tax professional.

In embodiments of the invention, the tax professional and financial professional are the same entity, or are employees of the same entity, or are otherwise associated with each other through, for example, a contractual or business relationship. In some embodiments, there is no financial professional involved. In other embodiments, there is no tax professional involved, such as in an instance where the taxpayer prepares their own tax return. As such, the term "tax professional" or "financial professional" is used throughout to denote either or both the tax professional and financial professional. The financial professional may also act on behalf of either the taxpayer or the tax professional in the discussed steps.

In still other embodiments of the invention, the invention is utilized by a taxing authority. The taxing authority (also known as a revenue service, revenue agency, or taxation authority) is a government entity or an entity associated with a government body. The taxing authority has, through prescribed legal authority, the power to assess, levy, and collect taxes. The taxing authority may also have the power to collect other non-tax-related revenue, such as penalties and interest. The taxing authority may perform secondary functions, such as investigating and charging tax fraud, performing audits, etc. The taxing authority can be at any level of government: international, federal, state, county, and city. Examples of taxing authorities include the IRS, the Missouri Department of Revenue, etc. The taxing authority may be motivated to utilize the invention to provide a safe method of electronic filing for the taxpayers, thereby encouraging electronic filing which is easier and cheaper to receive than paper tax returns. Further, the invention may be useful to a taxing authority to take a survey of incoming tax returns to determine how common fraudulent returns are. As an example, if the invention notes an increase in potentially fraudulent returns being received, the taxing authority may raise the number of intermediary nodes that are searched through by the external linking analyzer.

In one embodiment, the taxpayer enters information from his tax-related documents, such as W2s and 1099s, into the self-preparation tax return program. In another embodiment, the taxpayer provides the tax-related documents to the tax professional, who enters the information into a professional-preparation tax return program. The self-preparation tax return program and the professional-preparation tax return program may be the same as or interface with the computer program of embodiments of the invention. The tax return program generates a tax return.

The tax return is essentially a report filed with the appropriate government taxing authority, such as the IRS in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax professional calculates the taxes due. To assist in the calculation and to allow the taxing authority to verify the calculations, the tax return contains pertinent information associated with the taxpayer for the tax period. The tax return can be either written, digital, or a combination of both. In other embodiments, information relevant to the taxpayer and the tax to be paid are provided on other various forms and documents.

The "subject tax return," as used herein, refers to the tax return that is being subjected to the authentication by the invention. The subject tax return purports to relate to the taxes paid and owed by the subject taxpayer. The subject tax return includes information for the subject taxpayer, including identification information, contact information, and other tax information. As discussed above, the subject tax return may be designated for authentication as a free service or as an additional service by the tax professional, financial professional, and/or taxing authority. The subject tax return may refer to a set of information indicative of a tax return in lieu of a completed tax return itself. In embodiments of the invention, the system extracts key tax information from the subject tax return that aids in the detection of fraud. For example, the system may extract taxpayer identification information, deposit account information, employer information, etc., while not extracting the dollar amounts involved in the calculation of the tax due. In other embodiments, the complete and entire subject tax return is imported to the system for analysis, after which the system only analyzes the pertinent information.

Tax information associated with any tax return includes one or more of the following: name of taxpayer; name of taxpayer's spouse, if any; address; social security number; bank account information; wages; retirement investments; insurance distributions; income tax withholdings for the tax period; capital gains and losses; dependents, including number of dependents, names, and identifying information; tax deductible expenses, such as charitable contributions; and like information. The tax information may also be received from various sources, including a prior-year tax return filed by the taxpayer; entry of tax information by the taxpayer into a data store, such as via tax preparation software; and entry of tax information by a tax professional. For example, if the taxpayer uses self-preparation tax software, embodiments of the invention may generate or otherwise populate the database using tax information entered by the taxpayer via the self-preparation tax software. In alternative embodiments, the tax information may not necessarily be tax information associated with a tax return for the taxpayer but instead may be information associated with the taxpayer. For example, tax information may include a credit score (or credit score range) of the taxpayer or a name of credit accounts held by the taxpayer.

Tax returns are typically due in a tax return filing season following the tax year. A tax year is typically a calendar or fiscal year upon which the tax is calculated. A tax period may be another length of upon which the tax is calculated, such as a month, a quarter, half of a year, two years, five years, etc. It should be appreciated that the "current tax year" and "current tax period" as used herein, refers to the tax year or tax period for which the subject tax return relates. For example, a tax return submitted in March 2016 typically relates to the 2015 tax year. This is because the taxes accrue ending December 31 of the tax year and the tax return is submitted at some point in the following calendar year as prescribed by law (e.g., by April $15^{th}$). "Previous tax returns" can include previously filed tax returns for the current tax year and/or current tax period. To follow the above example, for a tax return submitted in March 2015, previous tax returns include tax returns submitted in January 2015 through March 2015 (up to immediately preceding the submission of said tax return). "Previous tax year" and "previous tax period," as used herein, refer to those tax years and tax periods for which tax returns are no longer being typically submitted. To follow the above example, for a tax return submitted in March 2015, previous tax years would include the 2013 tax year, the 2012 tax year, etc.

Conducting the Linking Relationships Analysis

The determination of confidence indicators based upon linked analysis will now be discussed. As discussed briefly above and in depth below, embodiments of the invention acquire data related to tax returns and users. These acquired data are the nodes used by embodiments to perform the linked analysis. Exemplary sources of the information, the methods of collection, and the analysis thereof are discussed below.

Figure 2:
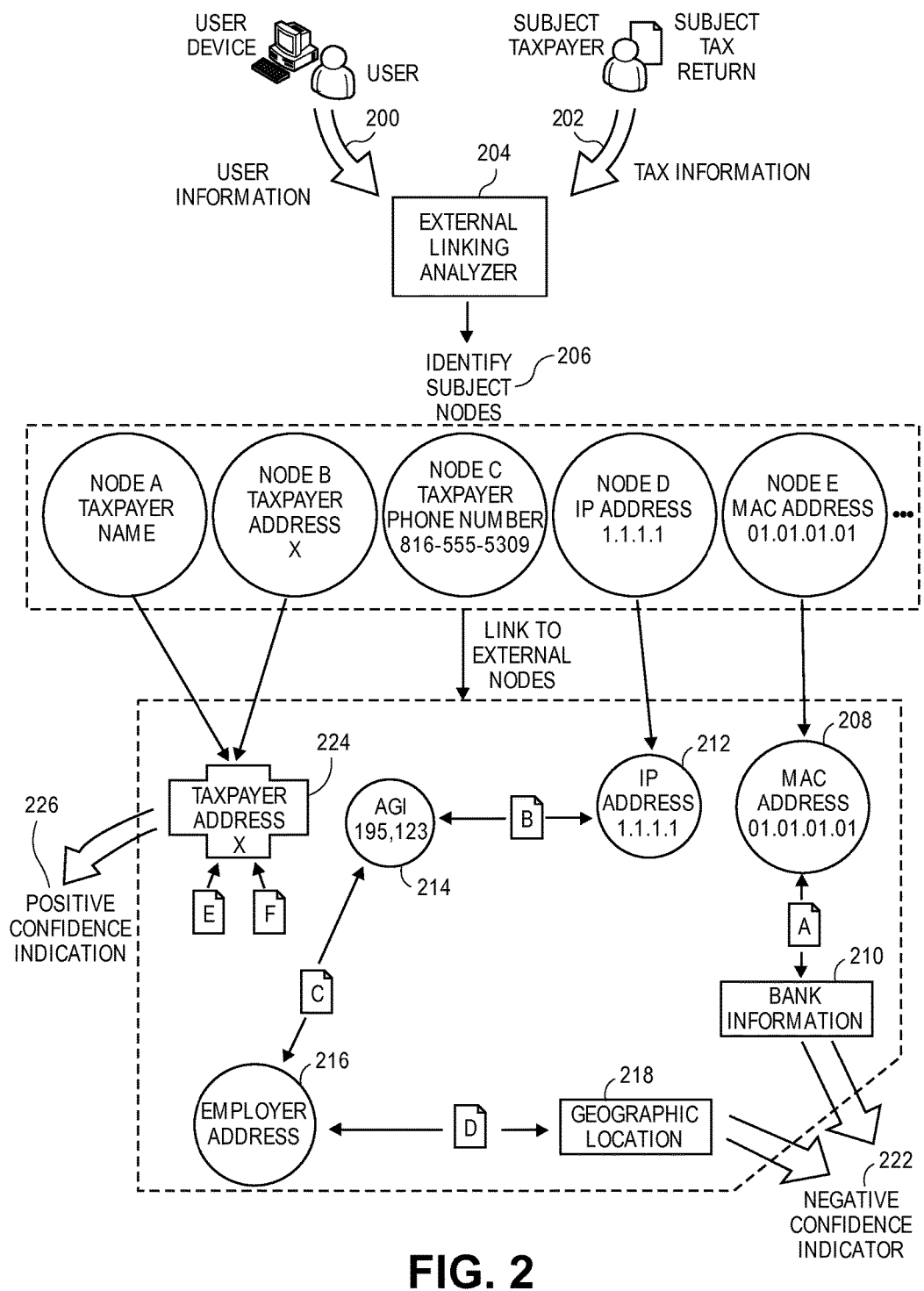
FIG. 2 is a flow diagram of a first embodiment of an external linking analyzer of the system of FIG. 1.

Turning to FIG. 2, exemplary steps of an external linking analyzer are illustrated. Broadly, the external linking analyzer acquires information about the user and/or the subject tax return. The external linking analyzer then compares this information to a set of known information. The external linking analyzer looks for commonalities with the known information. Upon finding such a commonality, the external linking analyzer will then analyze the source or sources of the information to determine if the source may be indicative of fraud. The external linking analyzer will then follow a chain by examining attributes of the source and seeking other sources with other commonalities. In this way, the external linking analyzer identifies confidence indicators based upon a deep analysis into the other users and tax returns that are related to the user and the subject tax return.

The "source" is the document or information from which the node is derived. Examples of sources include previously filed tax returns, user data associated with those tax returns, tax-related documents, fraud investigation documents, taxpayer accounts, user accounts, etc. In embodiments of the invention, the node will include information indicative of the source, where the source may be found, how the source can be located, a summary of other information from the source, etc. This allows the external linking analyzer to find links to other sources and nodes. Each source will typically provide the information for several (i.e., at least five, at least ten, at least twenty, or at least fifty) nodes. Nodes may also be indicative of more than one source. For example, if many tax returns are filed from a single IP address, the node corresponding to that IP address will allow linking through all of the source tax returns.

Figure 5:
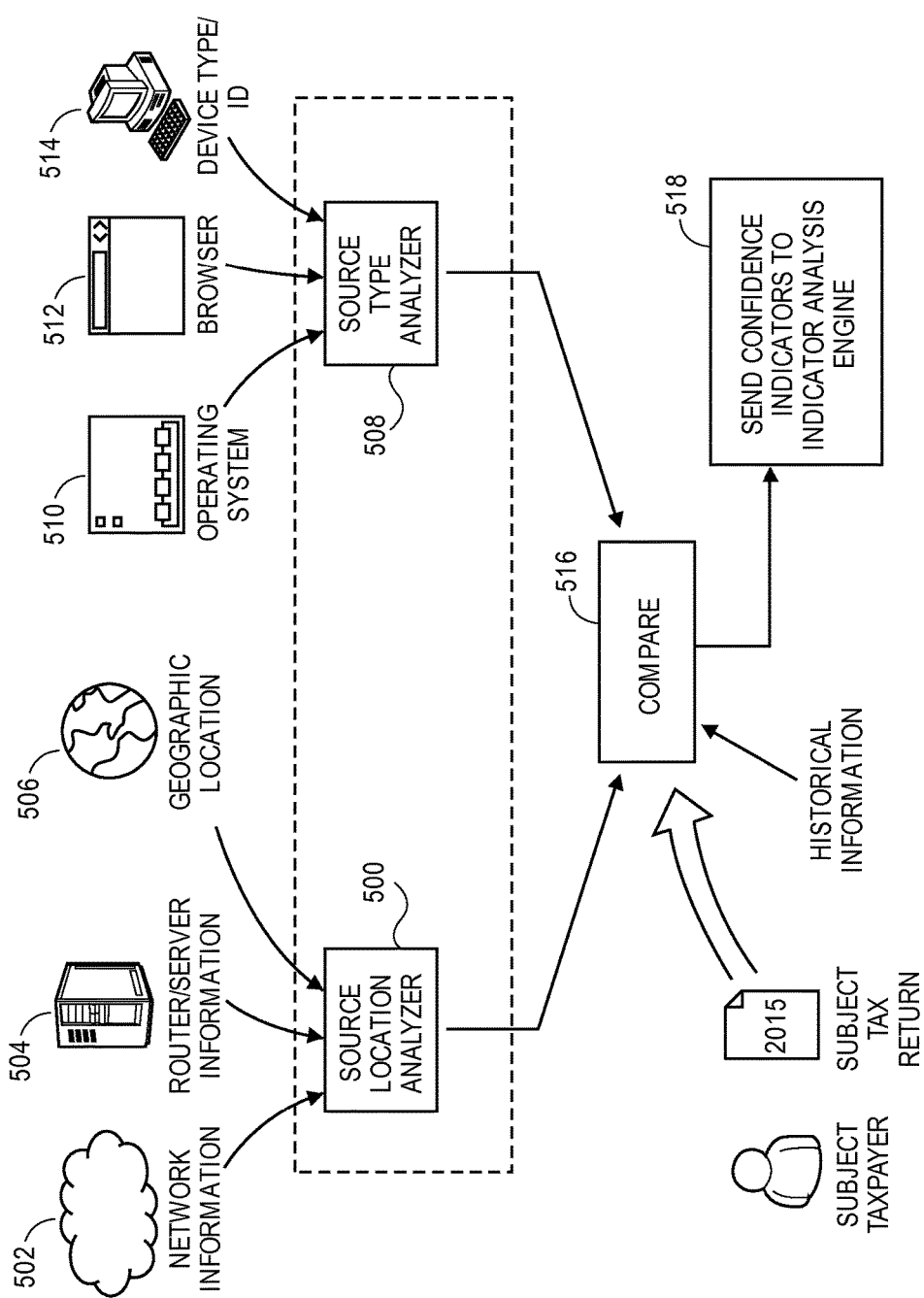
FIG. 5 is a flow diagram depicting exemplary sources of information related to a user and a user device.

In Step 200, the external linking analyzer acquires information related to the user and a user device. This information can include network information, router/server information, geographic location, operating system, browser information, device type, etc. Each of these information sources is illustrated in FIG. 5 and discussed in depth below. In Step 202, the external linking analyzer acquires information related to the subject tax return. The information may include identification information for the subject taxpayer, income information for the subject taxpayer, expense information for the subject taxpayer, contact information for the subject taxpayer, information as to the total tax owed or refund expected, etc. In various embodiments of the invention, the system extracts any, some, or all of the enumerated categories of information. In other embodiments of the invention, the system receives the entire subject tax return and does not extract information therefrom.

In Step 204, the external linking analyzer analyzes the acquired information. The external linking analyzer may receive information from the other various analyzers discussed above and illustrated in FIG. 1. For example, the external linking analyzer may receive raw data about the user from the user source location analyzer and analyze this raw data to determine what (if any) could be utilized in analyzing for fraud. As another example, the external linking analyzer may analyze the subject tax return and note certain characteristics or values within the subject tax return.

In Step 206, the external linking analyzer identifies subject nodes based upon the acquired and analyzed information. In some embodiments of the invention, the external linking analyzer receives the nodes directly from the various other analyzers or some system or process. For example, the tax return preparation program may identify specific nodes for analysis and send these nodes directly to the external linking analyzer.

Subject nodes are discrete sets of information that are related to the user and/or the subject tax return. Subject nodes are the subjects of the analysis that is performed. The subject nodes are organized into a set of subject nodes, as illustrated in FIG. 2. Each (or at least some) of the subject nodes within the set of subject nodes is compared to other nodes from other tax returns to look for commonalities that may be indicative of fraud.

A node is generally a certain, discrete item of information. Typically, a node will include an indication of a type of value (e.g., the taxpayer will receive a tax refund), the value itself (e.g., the monetary value of the tax refund), the source or sources of that value (e.g., the subject tax return was filed at a particular IP address or is associated with a particular phone number), and the likelihood that the source was genuine or fraudulent (e.g., a taxpayer identity confidence score). Accordingly there are numerous different types of nodes, based upon the plethora of information types that can be formed into a node. However, typically, nodes are treated equally and are linked freely regardless of type. In some embodiments, certain items of information associated with the subject tax return and taxpayer are identified as being particularly useful as nodes. For example, IP addresses and MAC addresses may be found to be effective nodes for tracing relationships, while a number of dependents and marital status may be found to be ineffective nodes. As such, in some embodiments only certain items or types of information are utilized as nodes. In other embodiments, there are primary nodes (that are likely useful in linking relationships in a meaningful way) and secondary nodes (that are less likely to be useful). In some embodiments, the primary nodes may be considered before secondary nodes, secondary nodes may only be considered if linked to a primary node, etc.

Nodes may also be categorized by the indication for which an association with the node is indicative. Some nodes may be generally indicative of fraud ("fraud-indicative nodes"), generally indicative of genuineness ("genuineness-indicative nodes"), or neutral. It should be noted that it is not necessarily the node itself that is indicative of fraud or genuineness, but the linked relationship that is indicative of fraud or genuineness. For example, there is nothing inherently fraudulent about a social security number, but a link to a duplicate social security number is indicative of fraud. Similarly, a duplicate contact phone number is not indicative of fraud, but if there are three or more tax returns that all have the same contact phone number listed, a fourth link to that phone number may be indicative of fraud. As another example, if a tax return is previously determined to be fraudulent, the nodes that are related to that tax return and/or user may become fraud-indicative nodes. Duplicate bank account information is also not necessarily fraud indicative unless the tax return bearing the duplicate bank account information was previously determined to be fraudulent. However, not all information on a fraudulent tax return is fraudulent. For example, a malfeasant may steal the identity of a legitimate taxpayer and file a fraudulent tax return including the stolen information and the malfeasant's bank information.

A node web, a node data store, a node database, or other collection of external nodes can be populated in any of several methods. External nodes are nodes from sources other than the subject tax return. In embodiments of the invention, former subject nodes (i.e., subject nodes from previously analyzed subject tax returns) populate the node web of external nodes. In these embodiments, once the analysis described herein is completed, the subject nodes are added to the pool of external nodes (now becoming "external" to newer subject nodes). In other embodiments, previously filed tax returns are analyzed and tax information and/or user data is extracted to be used in the system, as discussed below in FIG. 7. In some embodiments, a combination of the above-mentioned methods is used to populate the database of external nodes. It should therefore be appreciated that in some instances, external nodes may only be based upon information that appears on the various previously filed tax returns and in other instances external nodes may be based upon any or all of the analyzes discussed below.

Some external nodes may carry forward into proceeding tax years. This may be especially true for fraud-indicating nodes. Accordingly, some external nodes may reflect tax returns that were filed in previous tax years. Other external nodes may lose their significance after the current tax filing season. This may be especially true for neutral nodes (or fraud-indicative nodes with a low certainty of fraud).

Returning to the linking steps of FIG. 2, it should be appreciated that the discussed steps are exemplary and explain a few limited ways in which the linking can be performed. It should also be appreciated that, due to the vast amounts of data In Step 208, the external linking analyzer begins comparing the various subject nodes to the various external nodes. It should be appreciated that the number of external nodes can be truly massive, based upon the vast number of tax returns and associated users that are filed. In this example Step 208, the external linking analyzer searches for all MAC address (i.e., physical hardware addresses) looking for a match (or other commonality) with the value for the subject node ("01.01.01.01"). During the search, the external linking analyzer finds a match. This creates a link between the subject node and the external node. As can be appreciated, the external node exists in the database because it was previously associated with another filed tax return. The external linking analyzer then looks at the other source or sources of the information (this may be performed by analyzing additional information associated with the node, or by following a link as illustrated). The given MAC address was associated with a previously filed tax return (labeled "A").

In Step 210, the external linking analyzer determines if there is any reason that this association with Tax Return A should be indicative of fraud or genuineness. The external linking analyzer determines that Tax Return A included a set of bank information that is known to be fraudulent. It should be appreciated that the determination of fraudulent information was, in embodiments of the invention, determined previously in another iteration of the invention, by an external source, etc. The fraudulent status of the bank information is thereafter associated with the bank information node. The subject tax return and the user are now linked to a fraud-indicative node (the bank information) via an intermediary node (the MAC address). Any other analyzed tax returns having the MAC address will be identified as potentially fraudulent due to the relationship of the known fraudulent bank information with the MAC address listed on Tax Return A. This is a relatively direct indication of fraud, though not dispositive. For example, it could be that the other analyzed tax returns having the same MAC address as Tax Return A have this MAC address because the other analyzed tax returns were filed at a public computer, such as at a library or at a university computer laboratory. Thus, the other analyzed tax returns may eventually be determined to not be fraudulent based on other analyses performed by embodiments.

As a further example, it may be that a fraud-indicative node, such as the MAC address of the present example, may eventually be determined to be a neutral node or a genuineness-indicative node. That is, the nature of the node may change as the analyses of embodiments progress and more information is determined. As further illustration continuing with the present example, it may eventually be determined that the MAC address is not indicative of fraud (e.g., because associated with a public computer), even though there was a tax return having the MAC address and linked with a fraud-indicative node, namely the bank information.

In Step 212, the external linking analyzer examines the IP address associated with the user and finds a match. A tax return (labeled "B") was filed previously from the same IP address. Tax Return B is then analyzed to find any linking nodes to it. Eventually, in Step 214 the external linking analyzer finds a common node in the adjusted gross income level that is shared with Tax Return C. In Step 216, Tax Return C is analyzed to find any linking nodes to it. In Step 216, the external linking analyzer determines that Tax Return C lists a common employer address with Tax Return D.

Thus far, since Step 212, none of the nodes or their associated tax returns has had any indication of fraud recorded in the system. In Step 218, the external linking analyzer determines that Tax Return D includes a geographic location for the user that is indicative of fraud. As discussed below, certain user locations can be indicative of fraud. In this exemplary instance, the subject node IP address is connected through a first intermediary node (the common IP address), a second intermediary node (AGI), and a third intermediary node (employer address) to the fraud-indicative node (geographic location). As opposed to the above-mentioned example in Steps 208 and 210, this is a more strenuous and remote linking relationship.

In Step 222, the external linking analyzer determines confidence indicators based upon the analysis. Thus far, the subject tax return and the user have been connected to two known fraudulent nodes. Confidence indicators are based upon each or a combination of the linked relationships to the fraud-indicative nodes. Further, confidence indicators may differ in severity level. To further the above example of Steps 208 and 210, the linked relationship based upon the bank information may be a significant confidence indicator, whereas the linked relationship of Steps 212-218 based upon the geographic location may be an insignificant confidence indicator.

In Step 224, the external linking analyzer continues searching for node relationships. The external linking analyzer finds a commonality in the taxpayer address. This taxpayer address for example, has been proven to be a legitimate address and tied to legitimate Tax Return E and Tax Return F. The subject taxpayer name may also be associated with the address in a way that verifies authenticity, such as a government database. The external linking analyzer may then further investigate Tax Return E and Tax Return F and fail to find any matching nodes.

It should be noted, however, that just because the subject tax return includes some information that is proven to be genuine does not mean that the entire subject tax return is determined to be genuine. As discussed above, it is common for a malfeasant to steal or otherwise acquire information related to a legitimate taxpayer and/or tax return. It should be appreciated that, similarly to linked relationships with fraud-indicative nodes, linked relationships with genuineness-indicative nodes are not dispositive.

In Step 226, the external linking analyzer determines confidence indicators based upon the linked relationship discovered. The confidence indicators may be based upon the linked relationship, the verified taxpayer address, the fact that further investigation into Tax Return E and Tax Return F found no further linked nodes, etc. As discussed above, these confidence indicators are then sent to the indicator analysis engine for further analysis into determining whether the subject tax return and the user are likely genuine or fraudulent based upon this analysis and on any other analyzers that are being utilized.

Figure 3:
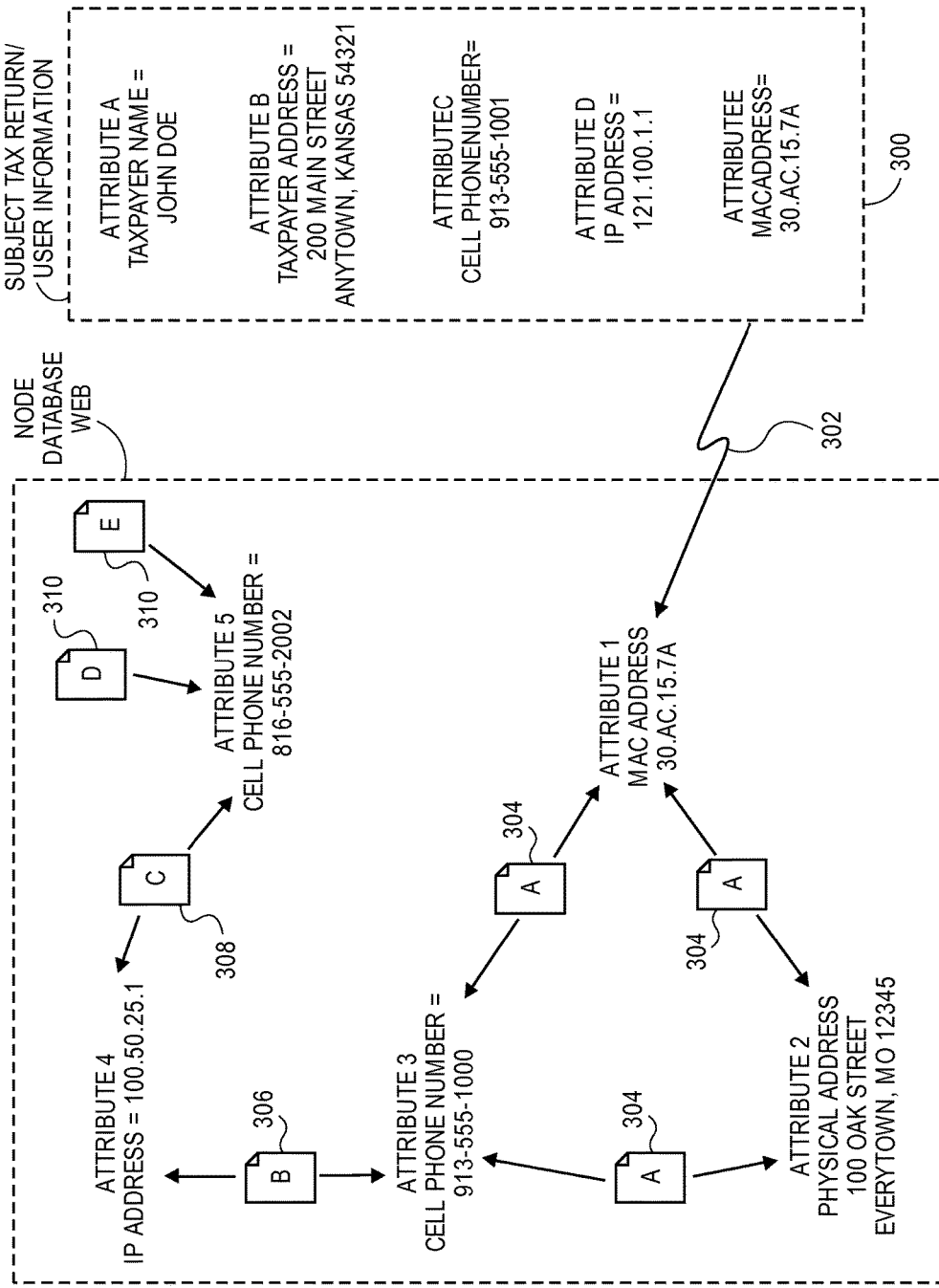
FIG. 3 is a flow diagram of a second embodiment of the external linking analyzer.

Turning to FIG. 3, another embodiment of the linking steps is illustrated. In these embodiments, the sources of information (e.g., the previously filed tax returns and/or user data for those previously filed tax returns) are analyzed based upon the nodes that come from them (as opposed to the nodes being analyzed, as in FIG. 2). In Step 300, the subject tax return and user information are acquired and then organized into subject nodes as discussed above in Steps 200-206. In Step 302, the external linking analyzer identifies a common node for the MAC address ("30.AC.15.7A") and links this common node to Tax Return A. In Step 304, the external linking analyzer looks at a node web that is related to Tax Return A. The node web includes all or most nodes with which Tax Return A is associated. In Step 304, the external linking analyzer compares the external nodes associated with Tax Return A with similar nodes in the subject tax return. For example, the external linking analyzer will detect that the physical addresses of the taxpayers are different (but it may also note that the addresses are in adjacent states). Further, the external linking analyzer will detect that the listed cell phone numbers are similar but not identical. As illustrated in FIG. 3, the listed cell phone numbers differ by only the last digit.

In Step 306, the external linking analyzer continues analyzing to identify other sources that may be linked to Tax Return A. The external linking analyzer notes that Tax Return B lists the same cell phone number as does Tax Return A (which is again, only one digit different than the subject tax return).

In Step 308, the external linking analyzer continues to search for related nodes based upon Tax Return B and finds Tax Return C, which lists a common IP address with Tax Return B as the origin. Again, the external linking analyzer may compare the identified node (the IP address) with a similar node in the subject nodes. In this instance, there is no discernable relationship between the external node ("100.50.25.1") and the subject node ("121.100.1.1").

In Step 310, the external linking analyzer continues to search for linked nodes to link to. The external linking analyzer finds that the cellphone number listed on Tax Return C is also listed on two other tax returns (Tax Return D and Tax Return E). It may be appreciated that more that two tax returns that claim the same phone number may potentially indicate fraud. The fact that three tax returns claim the same cell phone number may therefore be, in itself, an indication of fraud (even if there is no indication that any of the respective tax returns are fraudulent). In Step 310, the external linking analyzer may also compare the thrice-listed cell phone number against the subject node indicative of a cell phone number. In this example, no significant correlation is found. As discussed above in Steps 222 and 226, the external linking analyzer determines confidence indicators based on the above-discussed analysis.

In embodiments of the invention, the subject nodes are examined in a pre-determined order. As discussed above, some types of nodes are more likely to indicate fraud or genuineness than others. In both FIG. 2 and FIG. 3, the IP address and the MAC address of the user submitting the subject tax return are the first nodes to be tested. While this is only an exemplary, it can be appreciated that such information would be indicative of fraud and may therefore be among the first nodes tested. These types of nodes may be known as high-payoff nodes because a detailed analysis of them is the most likely to give strong indications for either fraud or genuineness. In some embodiments, there are various levels of high-payoff nodes that are tested in an order accordingly. Similarly, the confidence indicators identified may be based upon whether the subject node involved is a high-payoff node (and what is the corresponding level).

In some embodiments, all nodes are examined through a first intermediary node, before a further analysis is performed. Then all nodes are examined through a second intermediary node, etc. This provides a quick and relatively less-intensive search that expands as time and processing power allows. In some embodiments, high-payoff nodes are examined through more intermediary nodes than non-high-payoff nodes.

In some embodiments, the external linking analyzer carries the search through a certain number of intermediary nodes. Intermediary nodes are external nodes through which a relationship is determined. The nodes are "intermediary" because, for whatever reason, the analysis continued through the intermediary node to another node. One reason may be that the intermediary node is not fraud indicative or genuineness indicative, such that an analysis to the intermediary node provides little information as to the likelihood that the subject tax return is either fraudulent or genuine. For example, this may include searching through at least one intermediary node, at least two intermediary nodes, at least three intermediary nodes, at least four intermediary nodes, at least five intermediary nodes, etc. It should be appreciated that many of the nodes will include no further links as there are no nodes that share a commonality with that intermediary node. In other instances, the nodes will include no further links because either the node is already fraud-indicative or genuineness indicative (such that further analysis will provide little additional information), or further linking will not be performed because the above-discussed number of intermediary nodes has been reached (such that further analysis will provide little additional information).

In some embodiments of the invention, the external linking analyzer will terminate the search along a certain linking pathway upon finding a fraud-indicative node. In some embodiments, all forks of the linking analysis will cease upon either an arrival at a fraud-indicative node, a failure to find any more nodes that share a commonality, or the passing through of a certain number of intermediary nodes.

Figure 4:
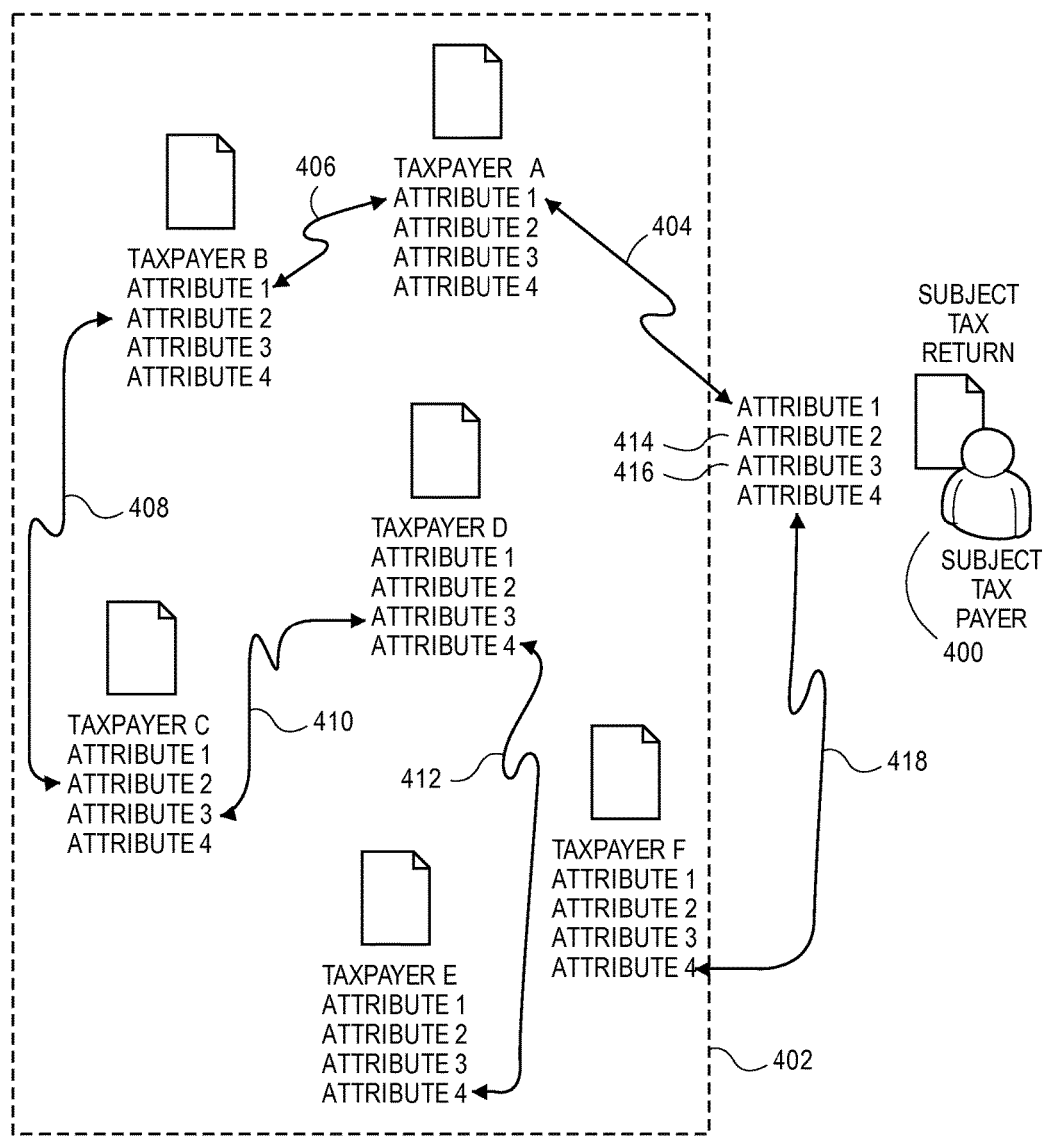
FIG. 4 is a flow diagram of a third embodiment of the external linking analyzer.

Turning to FIG. 4, another embodiment of the external linking analyzer is illustrated. In FIG. 4, the source documents (such as the tax return with associated user data) are treated as the nodes and the linking is via the related information sets. In Step 400, information related to the subject tax return and the subject taxpayer are acquired by the external linking analyzer. The various attributes of the acquired information are organized for analysis. In Step 402 the database of previously filed tax returns is accessed.

In Step 404, the external linking analyzer detects a duplicate of Attribute 1 in a tax return filed by Taxpayer A. The external linking analyzer then searches for more linking nodes by analyzing the various attributes of the tax return filed by Taxpayer A. In Step 406, the external linking analyzer finds yet another duplication of Attribute 1 in a tax return filed by Taxpayer B. In Step 408, the external linking analyzer searches for still further connections based upon the attributes of the tax return filed by Taxpayer B and finds a commonality with Attribute 2 in the tax return filed by Taxpayer C. In Step 410, a further commonality is found in Attribute 3 in the tax return filed by Taxpayer D.

Finally, in Step 412, a commonality between Attribute 4 on the tax return filed by Taxpayer D and the tax return filed by Taxpayer E is discovered. Based upon one of the above-mentioned factors, the chain is terminated. It should also be appreciated that Illustration 4 only illustrates a single chain to Taxpayer E. There would, in many instances, be numerous links fanning out from each tax return, based upon the numerous attributes therein as well as the numerous possible external nodes with which it could be connected. In Steps 414 and 416, the external linking analyzer continues searching for commonalities via the above-discussed steps. In this example, no matching attributes are found. In Step 418, a duplicate Attribute 4 is found in the tax return filed by Taxpayer F. The external linking analyzer may access taxpayer identity confidence scores or other fraud-indicative ratings of the identified tax returns and formulate confidence indicators based upon the discovered relationships, the number of intermediary nodes, the likelihood of fraud in each intermediary node, etc.

Direct Analysis and Acquiring Information for Linking

Figure 6:
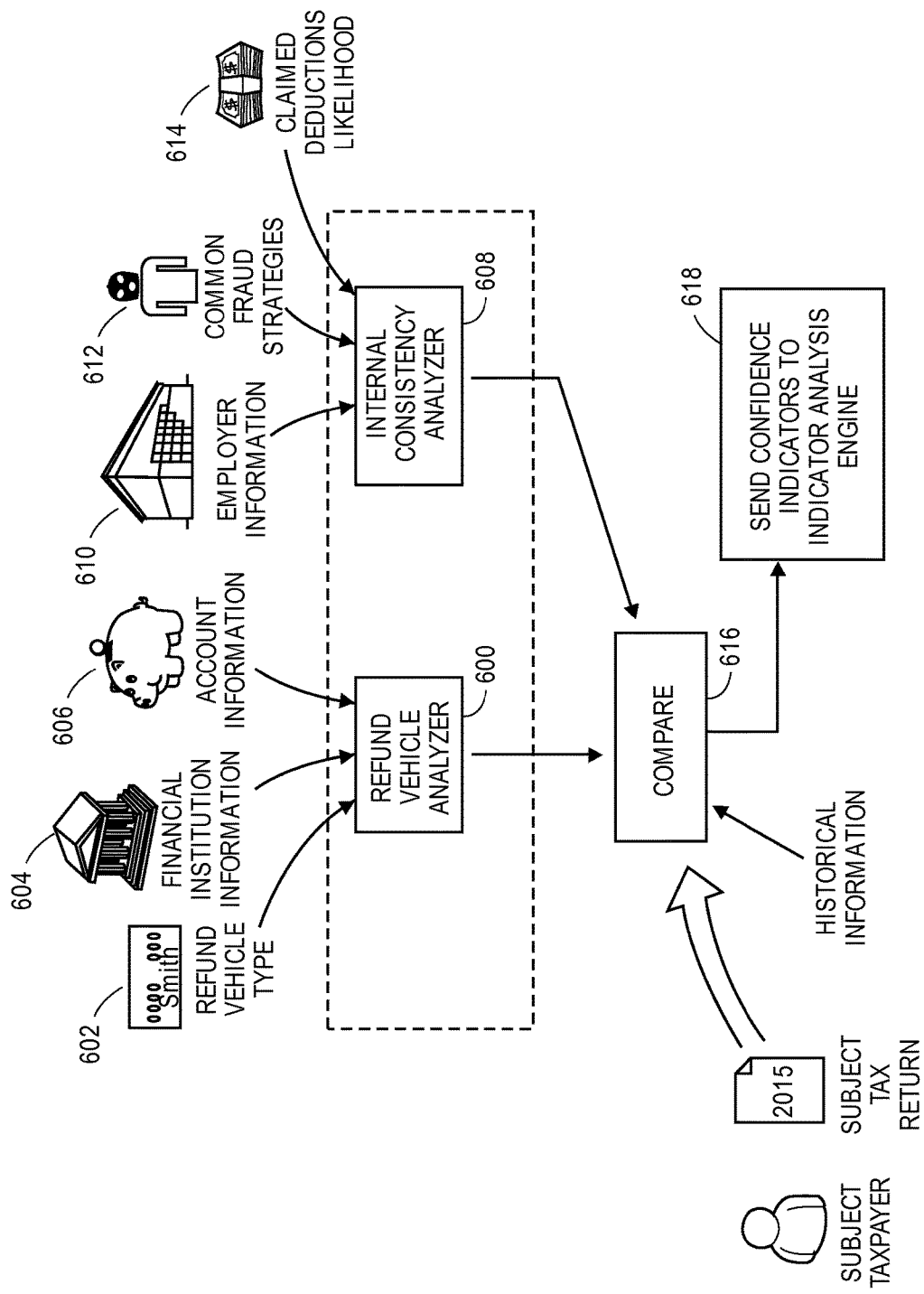
FIG. 6 is a flow diagram depicting exemplary sources of information related to information that appears on a subject tax return.
Figure 7:
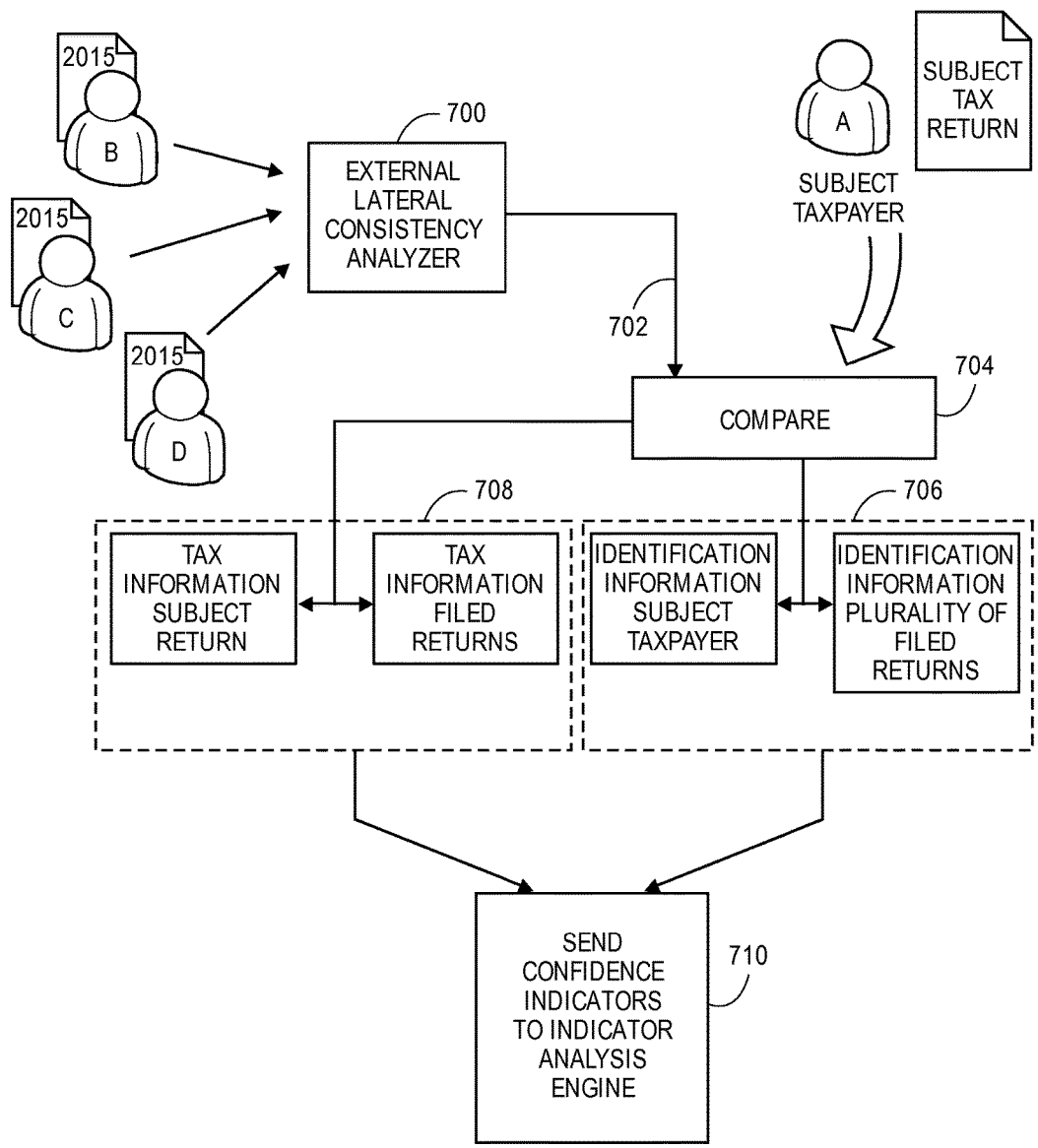
FIG. 7 is a flow diagram depicting exemplary sources of information related to other filed tax returns.

In embodiments of the invention, the external linking analyzer receives information from various other analyzers associated with the indicator acquisition engine. This information includes sources for subject nodes and for external nodes. In other embodiments, the external linking analyzer is a stand-alone system designed to acquire its own information, or to passively analyze information put into it. It should be appreciated that the steps described herein can be performed in any order, simultaneously, or not at all. FIGS. 5-7 depict the various analyzers that may work in conjunction with or independently from the external linking analyzer. In some embodiments, the direct analysis is performed by the various analyzers discussed below, and the external linking analyzer is only selectively utilized based upon an analysis of the confidence indicators that are discovered. For example, if the various analyzers determine that the subject tax return is either definitely genuine or definitely fraudulent (or a high probability of either), there may be little reason to perform the steps of the external linking analyzer. However, if the various analyzers cannot determine definitely or with a high probability whether the subject tax return is genuine, the system may utilize the external linking analyzer to make a deeper examination of the fraud indicators.

Turning to the figures, FIG. 5 depicts exemplary methods in which the system gathers information and detects confidence indicators as, during, or while the user connects to the system and/or a tax return program. In some embodiments this analysis is performed, at least in part, prior to the entry of information by the user.

In Step 500, the source location analyzer collects information related to the location and other network information related to the source computing device and the user. This information is relevant to determining how likely the user is in fact the subject taxpayer or someone authorized by the subject taxpayer. In Step 502, the source location analyzer retrieves network information. The network information is related to the computer network or networks to which the user device is connected and/or passes through before arriving at the system. Certain networks may be favored by malfeasants. Similarly, routing information through multiple hubs may also be indicative of fraud because the malfeasant is trying to hide his location and identity (as discussed below). Also, the malfeasant may utilize a mobile broadband network to mask an exact geographic location, while a legitimate taxpayer is more likely to utilize a DSL- or cable-based broadband connection. In Step 504, the source location analyzer retrieves router and server information associated with the computer networks. These specific routers and servers provide information about the type of user that is accessing them.

In Step 506, the source location analyzer retrieves and/or calculates geographic location information for the user and the user device. The geographic location information provides information as to the likelihood of genuineness or fraud. If the geographic location is near or in the geographic location for the subject taxpayer that is previously stored and/or verifiable, then it is likely that user is in fact the subject taxpayer. If the geographic location is outside the United States, then it is more likely that the user is a malfeasant (unless the subject taxpayer's address and/or employer address is in a foreign country). In the United States, taxpayers are permitted to file a tax return from outside the United States, but less than 2% of tax returns are filed from outside the United States. If no known address or employer is outside the United States, the odds that the subject taxpayer is traveling out of the country and has decided to prepare their tax return in another country is very low. Similarly, certain geographic locations outside the United States are known 'hotbeds' for U.S. tax fraud. These geographic locations have a much higher than usual propensity for being the source location for tax fraud within the United States.

In Step 508, the source type analyzer collects information related to the source type that is accessing the system and/or the tax return program. This information is relevant to the likelihood that the user is genuine or fraudulent. In many instances, the source type is not as important in the analysis as the consistency of the source type over time.

In Step 510, the source type analyzer retrieves information regarding an operating system used by the user device, such as WINDOWS™, iOS™, LINUX™ ANDROID™, etc. The source type analyzer may also retrieve information regarding a version number of the operating system, other programs installed on the source device, etc. Certain operating systems, and certain versions thereof, may be indicative that a malfeasant is utilizing the source device due to known security shortcomings of that operating system and/or version.

In Step 512, the source type analyzer retrieves information regarding an Internet browser being used to access the system and/or the tax return program, such as INTERNET EXPLORER™, FIREFOX™, CHROME™, SAFARI™, etc. As with operating systems, certain browsers may be preferred by malfeasants. Some browsers, such as TOR BROWSER™, are designed to mask the source location by rerouting information through a series of relays. These browsers may also be preferred by malfeasants attempting to block their source location and type.

In Step 514, the source type analyzer retrieves information related to the user device itself. The information may include the device type (e.g., desktop computer, laptop computer, tablet computer, smart phone, etc.). The information may also include a device identification number ("device ID"), such as a MAC address associated with a Network Interface Card or other physical address (also known as a Burned-In Address) associated with the source device. This information is used by the system to identify the specific user device that is accessing the system.

In Step 516, the system compares the information retrieved in the above-mentioned steps with information regarding the subject taxpayer, the subject tax return, and historical information. The historical information may be related to any or all of the above-discussed categories. For example, the system may compare the device ID of the user device to a previously stored device ID or device IDs previously utilized by the subject taxpayer in submitting previous tax returns. If the current device ID matches one of the previously stored device IDs, the system assigns a positive confidence indicator. As another example, the system may compare the geographic location of the user device with the various geographic locations recited on the subject tax return. If the user device is within a certain threshold distance of one of the locations on the subject tax return, the system assigns a positive confidence indicator. If the system can confirm that the user device is precisely located at one of the addresses on the subject tax return, the system may assign a very high positive confidence indicator.

As yet another example, if the operating system and browser of the user device change multiple times during the preparation and submission of the subject tax return, the system may assign a negative confidence indicator, as this is unusual activity for a taxpayer. Similarly, if the user utilizes a plurality of different user devices during the preparation of the subject tax return (e.g., more than three), the system may assign a negative confidence indicator.

While performing Step 516, the system may generate confidence indicators not based upon a comparison to the other factors. For example, the source device having a device ID that belongs to a known malfeasant may be a very negative confidence indicator without comparing the information to the subject tax return or historical information. Similarly, the use of a deceptive browser may be a negative confidence indicator even if the subject taxpayer utilized such a browser in the past.

In some embodiments of Step 518, the indicator acquisition engine sends the confidence indicators (and in some cases the underlying information) to the indicator analysis engine for further analysis and comparison (as discussed above).

Turning to FIG. 6, analysis of information appearing on the subject tax return will now be discussed. As with FIG. 5, it should be appreciated that similar steps may be take in the population of subject nodes and external nodes. In Step 600, the refund vehicle analyzer collects information related to the refund vehicle that is selected by the user to receive a tax refund. The refund vehicle is the financial product or account that the user has selected to have the tax refund delivered to them by the taxing authority. Exemplary refund vehicles include direct deposit into a deposit account, a written check sent to the taxpayer, a written check sent to the taxpayer's bank, a prepaid card, a credit to a credit card company or other financial institution, etc. In some instances, the taxpayer will assign any interest in the tax refund to a tax preparer or a third party in consideration of a refund anticipation loan. In some instances, the tax professional or a third party may open a new account for the taxpayer specifically for receipt of the tax refund. The refund vehicle analyzer therefore evaluates the selected refund vehicle and associated information to determine whether a malfeasant is attempting to illegally obtain the tax refund.

It should be noted that virtually all fraudulent tax returns claim a tax refund. This is because without a tax refund, the malfeasant has no incentive to file the fraudulent return. While it is conceivable that a malfeasant may prepare a tax return with no tax refund in order to establish a historical record for future fraudulent tax returns (so as to fool the external historical consistency analyzer), this is highly unlikely. Another conceivable scenario is that the malfeasant may submit the tax return with a tax debt owed to escape scrutiny and then later file an amended tax return that changes information so as to receive a tax refund. However, the amended tax return would likely receive heightened scrutiny so as to make this scenario improbable. Therefore, tax returns that correspond with a tax debt owed instead of a tax refund may be presumed genuine. It should also be noted that many malfeasants may claim a relatively low tax refund (e.g., $500) so as to escape increased or strict scrutiny by the taxing authority, or may claim an unusually large tax refund (e.g. $10,000) in an attempt to receive a high payoff. The amount of the tax refund may therefore be a confidence indicator.

In Step 602, the refund vehicle analyzer retrieves information related to a type of refund vehicle chosen by the user. Malfeasants prefer certain types of refund vehicles because they are untraceable, permanent, and anonymous. For example, a malfeasant may prefer to receive a tax refund on a prepaid card that is not associated with their name. The malfeasant can use the prepaid card without risking his identity. Similarly, the malfeasant may prefer to receive a tax refund via a written check. The malfeasant cashes the check (possibly using fraudulent identification bearing the name of the subject taxpayer) and then uses the cash anonymously. For these reasons, some taxing authorities do not allow or discourage certain refund vehicles in an attempt to mitigate fraud. Nonetheless, an attempt by the user to receive such a refund vehicle may be indicative of fraud. Similarly, if the refund vehicle is assigned to a third party, this may be indicative that the third party has verified the user is genuine or it may be indicative that the third party is a malfeasant.

In Step 604, the refund vehicle analyzer retrieves information for a financial institution related to the refund vehicle. Most refund vehicles (especially those allowed or preferred by taxing authorities) are associated with a financial institution in some way. For example, if the refund vehicle is a direct deposit, the financial institution is the bank that maintains the account. The refund analyzer therefore retrieves information about the financial institution to detect fraud. If the financial institution is located in a foreign country, this may be evidence of fraud. Similarly, if the financial institution is a small regional bank in a region where the subject taxpayer does not live or work, this may be an indication of fraud. If, however, the financial institution is located or has a branch near the subject taxpayer, this may be an indication of genuineness. The type of financial institution may also be relevant. For example, a large bank is assumed to have more stringent authentication and oversight of accounts than a payday loan establishment. Other relevant information could be how long the financial institution has been in business, the demographic clientele of the financial institution (and whether the subject taxpayer is in that demographic), past instances of fraud associated with that financial institution, known past data breaches associated with the financial institution (such that account information may have been compromised), known authentication and verification procedures utilized by the financial institution with regards to customers, etc.

In Step 606, the refund vehicle analyzer retrieves information related to the account within the financial institution to which the refund vehicle will be designated. The relevant information may include the type of account (e.g., checking, savings, etc.), the name associated with the account (i.e., if it is the same as or substantially similar to the subject taxpayer), the length of time the account has existed, the current balance of the account, the average number of transactions per month, the manner in which the account was created (in person or over the Internet), the last time that the account owner was at the financial institution, unusual debits or credits in the account, any other deposits of tax refunds for current and previous tax years, the average amount of employer deposits (and whether they are consistent with the reported income levels), the name of employers direct depositing wages (and whether they are consistent with employers appearing on the subject tax return), the presence of debits and credits consistent with charitable donations and other tax-significant transactions (and whether they are consistent with tax deductions and credits claimed on the subject tax return), large transfers of funds between accounts (that may be consistent with money laundering), debits on the account that are likely associated with business or personal expenses (and whether these are consistent with claimed business expenses on the subject tax return), etc.

It should be noted that in some instances, financial institutions would not (or legally cannot) share this information with the system, unless the system is associated with a taxing authority and/or a reputable tax professional. In some embodiments, the user may enter electronic login information for the financial institution to gain authority to access at least a portion of the above-mentioned information. In some embodiments, the system accesses the above-mentioned information upon the users input of information indicative of the financial institution and/or account. In other embodiments, the system accesses the above-mentioned information upon the completion of the subject tax return. It should also be noted that in addition to verifying the genuineness of the user, the refund vehicle analyzer may be utilized to ensure that even a genuine user has not under-reported income, over-reported expenses and charitable donations, etc. The system may therefore be utilized to determine fraudulent tax returns, meaning that the tax return and user are genuine but reporting false or misleading information to the taxing authority.

In Step 608, the internal consistency analyzer collects information related to the information input to or appearing on the subject tax return. In essence, the internal consistency analyzer examines the subject tax return for internal consistencies and inconsistencies that may be indicative of fraud.

In Step 610, the internal consistency analyzer collects information related to the employer of the subject taxpayer. The internal consistency analyzer may also collect information related to an educational institution related to the subject taxpayer, non-employer sources of income (such as corporations paying dividends to stock holders), etc. The internal consistency analyzer compares the type and specific institution involved with the type and amount of income provided. The internal consistency analyzer determines the likelihood that the income source and income amount are genuine, because a common tax fraud strategy is to under-report income. Income types and amounts may be typical of some sources and not with others. In some instances, the internal consistency analyzer may access external information to verify the consistency of the information on the subject tax return.

In Step 612, the internal consistency analyzer considers whether the subject tax return appears to be consistent with any common tax fraud strategies employed by malfeasants. Many of these common fraud strategies have been discussed throughout the application. The internal consistency analyzer in essence has or accesses formulas and information indicative of exemplary fraudulent tax returns. The internal consistency engine then compares these formulas and/or exemplary fraudulent tax returns to look for similarities.

As an example, if the user has entered a disposable, temporary e-mail address, this is a likely indication that the user is a malfeasant. Legitimate subject taxpayers have an interest in providing a valid and continually monitored e-mail address to the taxing authority and/or the taxing professional, such that the entity can contact the subject taxpayer if an issue or concern arises. The internal consistency engine therefore analyzes the input e-mail address to determine whether it is of a type that is potentially disposable and temporary (e.g., belongs to a domain that is a known provider of temporary e-mails, the address is a seemingly random character string, etc.). As another example, the internal consistency engine may determine whether the phone number of the subject taxpayer is likely a temporary or false phone number (e.g., 123-456-7890), whether the address is a P.O. Box or likely a false address (e.g., 123 456$^{th}$ St.), etc.

In Step 614, the internal consistency analyzer considers the claimed deductions and credits appearing on the subject tax return. Virtually all taxpayers qualify for some deductions and credits (including or in addition to the standard deduction). However, many fraudulent tax returns claim deductions and credits that are unrealistic in number and/or amount. In some embodiments, the internal consistency engine looks at the claimed deductions and credits and compares them to averages for the taxing authority. In some embodiments, the internal consistency engine determines a likelihood that the taxpayer does in fact qualify for the deductions and credits based upon external information, such as the account information accessed in Step 616 and known information about the subject taxpayer from previously filed tax returns. The internal consistency engine may also consider whether the deductions and credits are verifiable and whether the subject taxpayer previously claimed them (in similar amounts and sources).

In Step 616, the system compares the information retrieved in the above-mentioned steps with information regarding the subject taxpayer and the subject tax return. Based upon the comparisons and/or the above-discussed steps, the system identifies confidence indicators. The above-mentioned characteristics of Step 516 apply equally to Step 616. In some embodiments of Step 618, the indicator acquisition engine sends the confidence indicators (and in some cases the underlying information) to the indicator analysis engine for further analysis and comparison (as discussed above).

Turning to FIG. 7, comparisons to other filed tax returns will now be discussed. It should be appreciated that the discussion of FIG. 7 is in many ways related to the discussions above regarding FIGS. 2-4. In general, FIG. 7 is directed to an embodiment of the invention that receives a completed subject tax return and performs an analysis of the external lateral consistency analyzer. In some embodiments, the analysis of the internal consistency analyzer and the other analyzers may also be performed.

In Step 700, the system accesses, receives, or otherwise acquires tax information for the subject tax return. Based upon the entity that is utilizing the invention, as discussed above, the system may receive the tax information during preparation of the tax return, after completion of the tax return but prior to the filing process, after completion of the tax return at a time when filing is incipient, after transmission of the subject tax return to the taxing authority but before the taxing authority accepts the transmission, after transmission and acceptance of the subject tax return, within one minute of transmission and acceptance, within 24 hours of transmission and acceptance, within 72 hours of transmission and acceptance, etc. In some embodiments, the system receives the tax information upon a request by the user to print their electronic tax return for filing through the mail. In this way, users cannot circumvent the discussed steps by paper filing instead of filing electronically.

As discussed above, the subject tax return may be selected for authentication for any or all of numerous reasons, including: the client paid for the service, the service is provided as a value-added benefit to customers, the service is provided free of charge, the client has a high or moderate risk level for compromised information, a certain number of tax returns are authenticated at random, there are other risk factors present in the subject tax return (such as being filed from out of the country), the subject taxpayer is a prior victim of tax fraud, etc.

In Step 702, the system communicates with, downloads from, accesses, or otherwise acquires information stored in at least one filed return data store. The at least one filed return data store may be associated with any or all of the following: the tax professional, such that the filed return data store is a collection of at least some of the tax returns previously filed by the tax professional; the financial professional, such that the filed return data store is a collection of at least some of the tax returns for clients; the subject taxpayer, such that the previous tax returns of the subject taxpayer are stored by the subject taxpayer, such as on a personal computer; a plurality of tax professionals and/or financial professionals, such that the tax professionals and/or financial professionals share at least some of the information for their respective clients in a concerted effort to prevent fraud for all clients; the taxing authority, such that the taxing authority makes at least a portion of submitted tax returns for the current and/or previous years accessible to reputable tax professionals and/or financial professionals for fraud prevention; and/or a third party fraud prevention organization, such as a non-profit organization or government agency, that securely collects tax return information to be accessed by others for fraud prevention.

As mentioned above, the set of tax information for the previous tax returns may be located in, or associated with, more than one filed return data store. The filed return data stores may be associated with one another, separate and distinct, or both. The set of tax information for the previous tax returns may therefore be located in a plurality of locations. Nonetheless, the filed return data store is hereafter referred to in a singular manner. It should be appreciated that the filed return data store may include numerous disparate hardware (discussed more below).

The external nodes may be stored in an external node data store. The filed return data store and the external node data store may include information for a plurality, a few, many, a plethora, substantially all, or all of the tax returns previously submitted for the current tax year. The filed return data store may additionally, or in the alternative, include information for previous tax returns of the subject taxpayer (not illustrated). The filed return data store may additionally, or in the alternative, include information for a plurality, a few, many, a plethora, substantially all, or all of the tax returns submitted for at least one previous tax year (not illustrated). For example, the filed return data store may include other identification information such as usernames and passwords, customer profiles, user accounts (discussed below), contact information (discussed below), etc.

In some embodiments, the system accesses tax returns of different taxing authorities in Step 702. For example, a common fraud strategy is for a malfeasant to submit a substantially similar tax return to each or many of the states in the United States that have a state income tax. Because the various states do not share information well, the malfeasant can receive tax returns from numerous states utilizing a largely duplicative tax return. Embodiments of the invention compare the subject tax return to the tax returns filed in a plurality of taxing authorities.

The system compares the set of tax information for the subject tax return with the set of tax information for the previous tax returns. The comparisons attempt to identify confidence indicators as being present. The confidence indicators are indicative of possible, potential, likely, or definite fraud (or genuineness) in the subject tax return and/or at least one of the previous tax returns.

In Step 706, the system compares the subject nodes for the subject tax return with the external nodes for the filed tax returns from the same tax period and associated with different taxpayers. In embodiments of Step 706, the system is attempting to identify external nodes that include a commonality with the subject nodes. The commonality could include duplicate Social Security numbers, duplicate combinations of name and address, duplicate contact information, duplicate taxpayer identification numbers, etc. In addition or in the alternative, the system identifies duplicate information regarding the tax calculations. For example, it may be a confidence indicator if the income amounts and the charitable giving amounts are identical in two tax returns. Similarly, it may be a confidence indicator if the sources of normal income and the sources of capital gains income are identical in two tax returns (i.e. the malfeasant changing the identification information in each return but keeping the tax calculation information the same).

If the system does not detect any negative confidence indicators, the subject tax return may be verified. The system may then allow the filing, continue the filing, or do nothing. The system may also notify the subject taxpayer, the tax professional, the financial professional, and/or the taxing authority.

It should be noted, however, that just because a subject tax return is so verified, that does not mean the system is 100% certain that the subject tax return is genuine but only that the information and analysis available indicates genuineness. For example, a malfeasant may file a fraudulent tax return that assumes another's identity in January following a tax year, before many other tax returns have been filed for that tax year. Initially, this tax return is compared against the other returns for that year and may pass the verification. Then, in March, the taxpayer whose identity was assumed files their genuine tax return. At that time, the system determines confidence indicators. Based upon further analysis, the system may conclude that the previously-filed tax return was fraudulent and/or request authentication from the subject taxpayer. In this way, the fraud is detected and the taxing authority can take steps to cancel a pending tax refund for the malfeasant or attempt to retrieve an already issued tax refund to the malfeasant (such as from the malfeasant's bank account). The further steps of authentication and notification are discussed in depth below.

The system will then further analyze the subject tax return and/or the associated tax return to determine a taxpayer identity confidence score and which (if any, either, both, or all) of the tax returns is fraudulent. In essence, the system will attempt to determine whether the confidence indicator or indicators are actually indicative of fraud or whether they are innocuous errors and anomalies. As the system will in many instances not be able to determine this with 100% accuracy, the system may calculate a taxpayer identity confidence score. The system may in some instances determine within an allowable likelihood factor that the tax return is fraudulent or genuine.

In some embodiments of the invention, a list of fraud-indicative nodes and/or a list of genuineness-indicative nodes is generated. In these embodiments, the list of fraud-indicative nodes (which may be known as a "black list") and the list of genuineness-indicative nodes (which may be known as a "white list") are used to streamline the analysis described above. In some embodiments, the subject nodes are compared to the black list and/or the white list before any other external nodes. The level of certainty of fraud may also be dependent on the number of intermediary nodes that link the subject node to the fraud-indicative node or genuineness indicative node.

Additional Embodiments

Some embodiments of the invention assist the subject taxpayer in correcting fraud and dealing with the consequences thereof. For example, if the subject taxpayer is determined to be the victim of fraud as described above, the system may alert one of more credit organizations to inform them of the fraud. The system may also alert any relevant insurance company or credit card company. The system may also contact the bank for which the malfeasant selected as his deposit account, to inform that bank that their accounts are being used for fraudulent purposes. The bank may also be able to identify the malfeasant and put a hold on or close the account such that no other ill-gotten tax refunds are deposited therein.

While the disclosure has heretofore referred to taxing authorities, tax returns, and taxpayers. It should be appreciated that in other embodiments, the invention is directed to government entities other than taxing authorities, such as an administrative agency, or to companies or other organizations. The administrative agency may be associated with a government entitlement program, such as the Social Security Administration or Medicaid. The administrative agency may additionally, or in the alternative, be associated with a regulatory program, such as the Environmental Protection Agency or the Securities and Exchange Commission. The company or organization may be associated with or performing the functions of, a government entity, or it may be a for-profit or not-for-profit entity unrelated to the government. For example, the government entity or company may receive and process claim forms and the like that would be subject to fraud.

In these embodiments, the "taxpayer" may instead be a "beneficiary," a "citizen," a "customer," a "third party," etc. While most of the present disclosure is directed to the field of taxes, this is only an exemplary field of use. For example, if the "taxing authority" is the Social Security Administration, then the "taxpayer" would be referred to as a "beneficiary." This disclosure is therefore not intended to be limiting, but instead provide an easy-to-understand exemplary embodiment of the invention.

Other embodiments of the system will now be discussed. The system of embodiments may comprise various engines and analyzers for performing the above-discussed steps, additionally or alternatively to the above discussed engines and analyzers. Some embodiments of the invention comprise a return verification engine that acquires subject tax information indicative of a subject tax return to be verified. The return verification engine accesses the filed tax information associated with the current tax period from the filed return data store. The return verification engine compares the subject tax information to the filed tax information to identify at least one confidence indicator.

Some embodiments of the system further comprise an authentication engine for requesting, from the user, authentication information associated with the subject taxpayer to authenticate the subject taxpayer and comparing the received authentication information with a pre-stored known authentication information associated with the subject taxpayer to authenticate the subject tax return as properly associated with the subject taxpayer.

Some embodiments of the system further comprise a notification engine for notifying the user, using a set of taxpayer identification information associated with the subject taxpayer, of the fraudulent tax return.

Some embodiments of the system further comprise a risk analysis engine for accessing the repository of high-risk data that includes information indicative of a plurality of taxpayers whose identification information has been compromised. The risk analysis engine determines a risk level associated with the subject taxpayer by comparing the subject taxpayer identification information to the accessed information from the repository of high-risk data.

System Hardware

Figure 8:
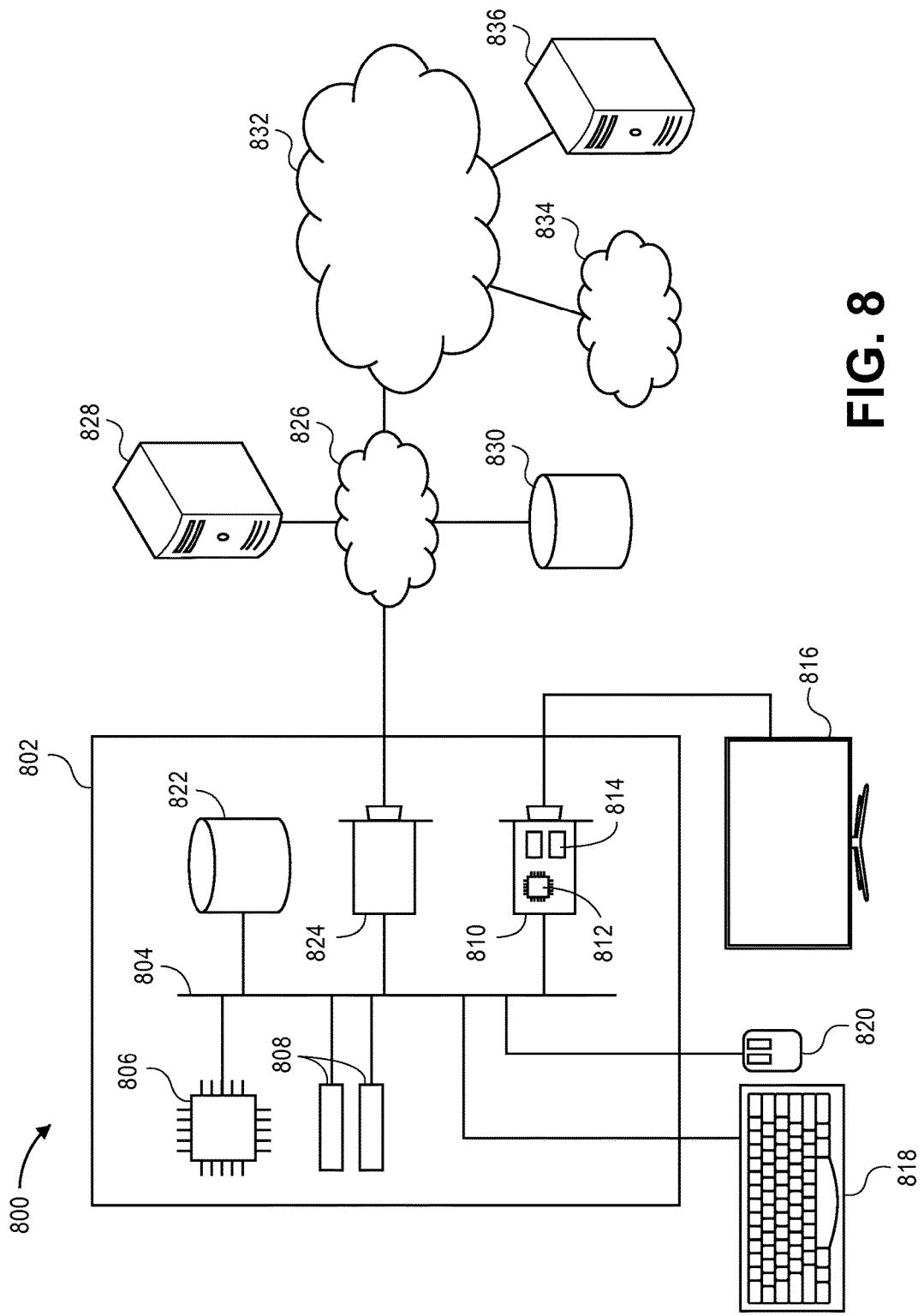
FIG. 8 is a system diagram of an embodiment of the invention depicting various computing devices and their components.

Turning to FIG. 8, the physical hardware that makes up the system will now be discussed. The system 800 comprising an exemplary hardware platform that can form one element of certain embodiments of the invention is depicted. Computer 802 can be a desktop computer, a laptop computer, a server computer, a mobile device such as a smartphone or tablet, or any other form factor of general- or special-purpose computing device. Depicted with computer 802 are several components, for illustrative purposes. In some embodiments, certain components may be arranged differently or absent. Additional components may also be present. Included in computer 802 is system bus 804, whereby other components of computer 802 can communicate with each other. In certain embodiments, there may be multiple busses or components may communicate with each other directly. Connected to system bus 804 is central processing unit (CPU) 806. Also attached to system bus 804 are one or more random-access memory (RAM) modules 808.

Also attached to system bus 804 is graphics card 810. In some embodiments, graphics card 804 may not be a physically separate card, but rather may be integrated into the motherboard or the CPU 806. In some embodiments, graphics card 810 has a separate graphics-processing unit (GPU) 812, which can be used for graphics processing or for general purpose computing (GPGPU). Also on graphics card 810 is GPU memory 814. Connected (directly or indirectly) to graphics card 810 is display 816 for user interaction. In some embodiments no display is present, while in others it is integrated into computer 802. Similarly, peripherals such as keyboard 818 and mouse 820 are connected to system bus 804. Like display 816, these peripherals may be integrated into computer 802 or absent. Also connected to system bus 804 is local storage 822, which may be any form of computer-readable media, and may be internally installed in computer 802 or externally and removably attached.

Finally, network interface card (NIC) 824 is also attached to system bus 804 and allows computer 802 to communicate over a network such as network 826. NIC 824 can be any form of network interface known in the art, such as Ethernet, ATM, fiber, Bluetooth, or Wi-Fi (i.e., the IEEE 802.11 family of standards). NIC 824 connects computer 802 to local network 826, which may also include one or more other computers, such as computer 828, and network storage, such as data store 830. Local network 826 is in turn connected to Internet 832, which connects many networks such as local network 826, remote network 834 or directly attached computers such as computer 836. In some embodiments, computer 802 can itself be directly connected to Internet 832.

Computer Program

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, smart watches, wearable technology, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

Embodiments of the invention directed to the computer program may perform any or all of the above-discussed steps. The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the taxpayer may be provided with a taxpayer account that permits the taxpayer to access embodiments of the invention that are applicable to submitting and authenticating their tax return. Additionally, the tax professional or financial professional may be provided with a tax/financial professional account that permits the tax professional or financial professional to access embodiments of the invention that are applicable to accessing the filed return data store, verifying their customer, etc. In addition, any number and/or any specific types of account are provided to carry out the functions, features, and/or implementations of the invention. Upon the taxpayer, third party, tax professional, and/or financial professional logging in to the electronic resource for a first time, they may be required to provide various pieces of identification information to create their respective accounts. Such identification information may include, for instance, personal name, business name, email address, phone number, or the like. Upon providing the identification information, the taxpayer, third party, and/or tax professional may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer-readable storage medium having a computer program stored thereon for determining confidence indicators that correspond with a user, wherein the computer program instructs at least one processing element to perform the following steps:
    receiving, from a user device via a graphical user interface, at least one of tax information associated with a subject tax return for a subject taxpayer and user information associated with a user that submitted the subject tax return;
    identifying, by the processing element, a plurality of subject nodes related to said received at least one of tax information and user information;
    comparing, by the processing element, the plurality of subject nodes to a set of external nodes, wherein a portion of the set of external nodes is fraud-indicative nodes;
    linking, by the processing element, at least one subject node to at least one fraud-indicative node through at least one intermediary node;
    identifying, by the processing element, confidence indicators based upon the linking,
    wherein each confidence indicator is indicative that the user is either genuine or fraudulent;
    determining, by the processing element, a likelihood that the user is genuine; and
    filing, with a computing device of a taxing authority, the subject tax return upon said likelihood being over a threshold.

2. The non-transitory computer readable storage medium of claim 1, wherein the step of identifying subject nodes is based, at least in part, upon a geographic location of a source computing device used by the user in submitting the subject tax return.

3. The non-transitory computer readable storage medium of claim 1, wherein the step of identifying subject nodes is based, at least in part, upon attributes of a source computing device used by the user in submitting the subject tax return.

4. The non-transitory computer readable storage medium of claim 1, wherein the step of identifying subject nodes is based, at least in part, upon an attribute of the tax information associated with the subject tax return.

5. The non-transitory computer readable storage medium of claim 4, wherein said portion of the tax information is selected based upon common fraud-indicative information associated with the tax return.

6. The non-transitory computer readable storage medium of claim 1, wherein the set of external nodes is derived from previously filed tax returns.

7. The non-transitory computer readable storage medium of claim 6, wherein the fraud-indicative nodes of the set of external nodes are derived from known or suspected fraudulent tax returns.

8. The non-transitory computer readable storage medium of claim 6, wherein at least one fraud-indicative node of the set of external nodes is derived from multiple previously filed tax returns.

9. The non-transitory computer readable storage medium of claim 1, wherein the step of linking includes searching for links to the fraud-indicative node through a certain number of intermediary nodes.

10. The non-transitory computer readable storage medium of claim 9, wherein said certain number of intermediary nodes being linked through is at least three.

11. The non-transitory computer readable storage medium of claim 1, further comprising the following step:
    linking at least one subject node to at least one genuineness-indicative node through at least one intermediary node.

12. The non-transitory computer readable storage medium of claim 11, wherein the step of linking includes searching for genuineness-indicative nodes through a certain number of intermediary nodes.

13. A computerized method for determining a likelihood that a user submitting a subject tax return is genuine, the method comprising the following steps:
    receiving, from a user device via a graphical user interface, user information and subject tax return information;
    determining, by a processing element, a plurality of confidence indicators regarding the user,
    wherein each confidence indicator is indicative that the user is either genuine or fraudulent,
    wherein said step of determining a plurality of confidence indicators is performed by—
        acquiring a plurality of subject nodes related to the user information and the subject tax return information,
        comparing the plurality of subject nodes to a set of external nodes,
        linking at least one subject node to at least one fraud-indicating node through at least one intermediary node,
        wherein said fraud-indicating node and said intermediary node are within the set of external nodes;
    analyzing, by the processing element, said plurality of confidence indicators,
    determining, by the processing element, a likelihood that the user is genuine; and
    filing, with a computing device associated with a taxing authority, the subject tax return upon said likelihood being over a threshold.

14. The computerized method of claim 13, further comprising acquiring confidence indicators based upon a geographic location of a source computing device that the user is accessing.

15. The computerized method of claim 13, further comprising acquiring confidence indicators based upon attributes of a source computing device that the user is accessing.

16. The computerized method of claim 13, further comprising acquiring confidence indicators based upon the presence or absence of user authentication information associated with the user.

17. The computerized method of claim 13, further comprising acquiring confidence indicators based upon a comparison of the content of the subject tax return with the content of at least one prior tax return for the subject taxpayer.

18. A method of determining whether a subject tax return is fraudulent, the method comprising the following steps:
    generate, by a processing element, a plurality of external nodes based upon previously filed tax returns,
    wherein at least a portion of the external nodes are fraud-indicative nodes and at least a portion of the external nodes are neutral nodes;
    link, by the processing element, the plurality of external nodes together via shared relationships of related information;

acquire, from a user device via a graphical user interface, tax information related to the subject tax return;

identify, by the processing element, subject nodes based upon the tax information;

compare, by the processing element, the subject nodes to external nodes for related information;

link, by the processing element, at least one subject node to at least one fraud-indicative node via at least one neutral node;

determine, based on said linking of at least one subject note to at least one fraud-indicative node, a likelihood that the user is fraudulent; and prevent filing, upon said likelihood being over a threshold, of the subject tax with a taxing authority.

19. The method of claim 18, wherein the step of linking includes searching for fraud-indicative nodes through a certain number of neutral nodes, said neutral nodes being linked via other neutral nodes related to a common previously filed tax return.

20. The method of claim 19, wherein said certain number of neutral nodes being linked through is at least three.

\* \* \* \* \*